US012105464B2

(12) United States Patent
Kimura

(10) Patent No.: US 12,105,464 B2
(45) Date of Patent: Oct. 1, 2024

(54) OPERATION ASSISTING TOOL AND IMAGE FORMING APPARATUS INCLUDING THE OPERATION ASSISTING TOOL

(71) Applicant: Ippei Kimura, Osaka (JP)

(72) Inventor: Ippei Kimura, Osaka (JP)

(73) Assignee: RICOH COMPANY, LTD., Tokyo (JP)

( * ) Notice: Subject to any disclaimer, the term of this patent is extended or adjusted under 35 U.S.C. 154(b) by 57 days.

(21) Appl. No.: 17/868,781

(22) Filed: Jul. 20, 2022

(65) Prior Publication Data

US 2023/0065095 A1 Mar. 2, 2023

(30) Foreign Application Priority Data

Aug. 26, 2021 (JP) ................................ 2021-138375

(51) Int. Cl.
*G03G 21/16* (2006.01)
*G03G 21/18* (2006.01)

(52) U.S. Cl.
CPC ......... *G03G 21/1614* (2013.01); *G03G 21/16* (2013.01); *G03G 21/1604* (2013.01); *G03G 21/1623* (2013.01); *G03G 21/1661* (2013.01); *G03G 21/1695* (2013.01); *G03G 21/1846* (2013.01); *G03G 2215/00004* (2013.01); *G03G 2215/00135* (2013.01); *G03G 2221/1846* (2013.01)

(58) Field of Classification Search
CPC ............... G03G 21/16; G03G 21/1604; G03G 21/1614; G03G 21/1623; G03G 21/1661; G03G 21/1695; G03G 21/1846; G03G 2215/00004; G03G 2215/00135; G03G 2221/1846
See application file for complete search history.

(56) References Cited

U.S. PATENT DOCUMENTS

| | | | | |
|---|---|---|---|---|
| 2008/0106774 A1* | 5/2008 | Koiwai | H04N 1/00551 399/380 |
| 2009/0315250 A1 | 12/2009 | Kimura et al. | |
| 2011/0176847 A1* | 7/2011 | Brewer, III | G03G 21/1614 399/380 |
| 2013/0228962 A1 | 9/2013 | Kimura et al. | |
| 2014/0328606 A1* | 11/2014 | Katsuyama | G03G 21/1647 399/92 |
| 2017/0285564 A1* | 10/2017 | Ogasahara | G03G 21/1647 |

(Continued)

FOREIGN PATENT DOCUMENTS

| | | |
|---|---|---|
| EP | 3 825 769 A1 | 5/2021 |
| JP | 2008-213678 | 9/2009 |

(Continued)

OTHER PUBLICATIONS

"Stay Safe Carabiner", Apr. 9, 2020 (Apr. 30, 2020), pp. 1-16, XP093015436, Retrieved from the Internet: URL:https://www.kickstarter.com/projects/stay-safe-lab/stay-safe-carabiner-anti-microbial-copper-coronavirus-covid [retrieved on Jan. 18, 2023], 16pp.

(Continued)

*Primary Examiner* — Joseph S Wong
(74) *Attorney, Agent, or Firm* — XSENSUS LLP

(57) ABSTRACT

An operation assisting tool includes a gripper, and an engagement portion to engage with a handle of a drawer drawable from a housing of an image forming apparatus.

18 Claims, 11 Drawing Sheets

(56) References Cited

U.S. PATENT DOCUMENTS

| | | | |
|---|---|---|---|
| 2019/0152729 | A1 | 5/2019 | Kimura |
| 2020/0216277 | A1 | 7/2020 | Ohishi et al. |
| 2020/0239281 | A1 | 7/2020 | Kimura |
| 2021/0155426 | A1 | 5/2021 | Kamichi |

FOREIGN PATENT DOCUMENTS

| | | |
|---|---|---|
| JP | 2015-111211 | 6/2015 |
| JP | 3227521 | 9/2020 |
| JP | 2021-080090 | 5/2021 |

OTHER PUBLICATIONS

Extended European Search Report issued Jan. 30, 2023, in corresponding European Patent Application No. 22191921.0, 8pp.

* cited by examiner

OPERATION ASSISTING TOOL AND IMAGE FORMING APPARATUS INCLUDING THE OPERATION ASSISTING TOOL

CROSS-REFERENCE TO RELATED APPLICATION

This patent application is based on and claims priority pursuant to 35 U.S.C. § 119(a) to Japanese Patent Application No. 2021-138375, filed on Aug. 26, 2021, in the Japan Patent Office, the entire disclosure of which is hereby incorporated by reference herein.

BACKGROUND

Technical Field

Embodiments of the present disclosure relate to an operation assisting tool and an image forming apparatus including the operation assisting tool.

Background Art

Various types of image forming apparatuses are known in the art to include a drawer unit that is drawable from the housing of an image forming apparatus.

An image forming apparatus includes a sheet tray as a drawer. A handle is attached to the sheet tray, so that a user grips and pulls the handle to draw the sheet tray from the housing of an image forming apparatus.

SUMMARY

Embodiments of the present disclosure described herein provide a novel operation assisting tool including a gripper and an engagement portion to engage with a handle of a drawer drawable from a housing of an image forming apparatus.

Further, embodiments of the present disclosure described herein provide an image forming apparatus including a housing, a drawer drawable from the housing, and the above-described operation assisting tool.

BRIEF DESCRIPTION OF THE SEVERAL VIEWS OF THE DRAWINGS

Exemplary embodiments of this disclosure will be described in detail based on the following figures, wherein.

Figure 1:
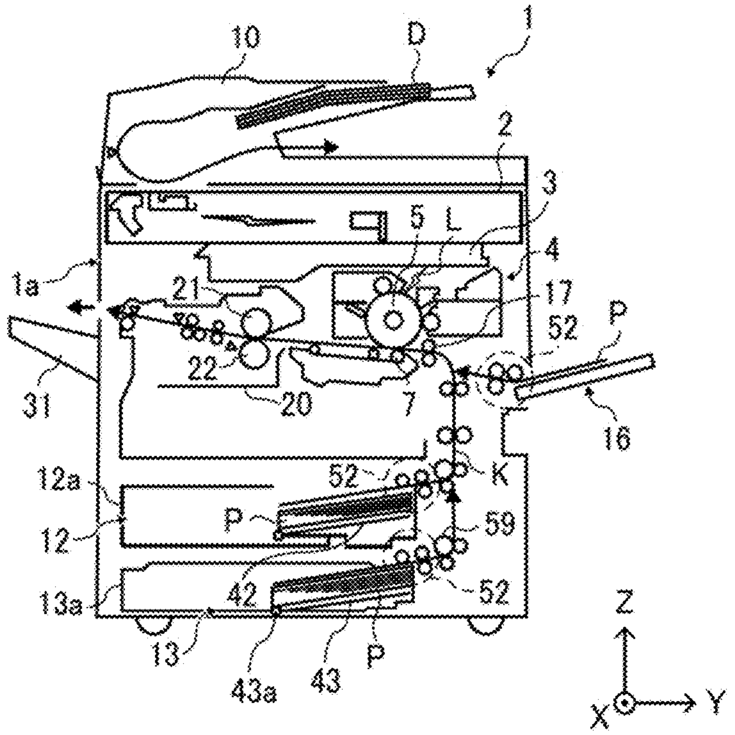
FIG. 1 is a schematic diagram illustrating a configuration of an image forming apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

It will be understood that if an element or layer is referred to as being “on,” “against,” “connected to” or “coupled to” another element or layer, then it can be directly on, against, connected or coupled to the other element or layer, or intervening elements or layers may be present. In contrast, if an element is referred to as being “directly on,” “directly connected to” or “directly coupled to” another element or layer, then there are no intervening elements or layers present. Like numbers referred to like elements throughout. As used herein, the term “and/or” includes any and all combinations of one or more of the associated listed items.

Spatially relative terms, such as “beneath,” “below,” “lower,” “above,” “upper” and the like may be used herein for ease of description to describe one element or feature’s relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements describes as “below” or “beneath” other elements or features would then be oriented “above” the other elements or features. Thus, term such as “below” can encompass both an orientation of above and below. The device may be otherwise oriented (rotated 90 degrees or at other orientations) and the spatially relative descriptors herein interpreted accordingly.

The terminology used herein is for describing particular embodiments and examples and is not intended to be limiting of exemplary embodiments of this disclosure. As used herein, the singular forms “a,” “an,” and“the” are intended to include the plural forms as well, unless the context clearly indicates otherwise. It will be further understood that the terms “includes” and/or “including,” when used in this specification, specify the presence of stated features, integers, steps, operations, elements, and/or components, but do not preclude the presence or addition of one or more other features, integers, steps, operations, elements, components, and/or groups thereof.

Referring now to the drawings, embodiments of the present disclosure are described below. In the drawings for explaining the following embodiments, the same reference codes are allocated to elements (members or components) having the same function or shape and redundant descriptions thereof are omitted below.

Next, a description is given of a configuration and functions of an operation assisting tool and an image forming apparatus incorporating the operation assisting tool, according to an embodiment of the present disclosure, with reference to drawings. Note that identical parts or equivalents are given identical reference numerals and redundant descriptions are summarized or omitted accordingly.

Referring now to FIG. 1, a description is given of an overall configuration and operations of an image forming apparatus 1 according to an embodiment of the present disclosure.

FIG. 1 is a schematic diagram illustrating a configuration of an image forming apparatus according to an embodiment of the present disclosure.

In FIG. 1, the image forming apparatus 1 includes a document reading device 2, an exposure device 3, an image forming device 4, a photoconductor drum 5, a transfer device 7, a document conveyance device 10, sheet feeding devices 12 and 13, a bypass sheet feeding device 16, a registration roller pair 17, a fixing device 20, a fixing roller 21, a pressure roller 22, and a sheet ejection tray 31. The document reading device 2 optically reads image data of an original document D. The exposure device 3 emits an exposure light L based on the image data read by the document reading device 2 to irradiate the exposure light L onto a surface of the photoconductor drum 5 that functions as an image bearer. The image forming device 4 forms a toner image on the surface of the photoconductor drum 5. The transfer device 7 transfers the toner image formed on the surface of the photoconductor drum 5 onto a sheet P serving as a recording medium.

The document conveyance device 10 corresponding to an automatic document feeder (ADF) conveys the original document D set in the document conveyance device 10 to the document reading device 2. The sheet feeding device 12 feeds sheets P accommodated in a sheet tray 12*a*, and the sheet feeding device 13 feeds sheets P stored in a sheet tray 13*a*. The bypass sheet feeding device 16 feeds sheets P that is manually set by a user.

The registration roller pair 17 serving as a conveyance roller pair conveys the sheet P toward the transfer device 7. The fixing device 20 fixes a toner image (unfixed image) borne on the on the sheet P to the sheet P. The fixing device 20 includes the fixing roller 21 and the pressure roller 22. The sheet ejection tray 31 stacks the sheets P ejected from the housing of the image forming apparatus 1.

The sheet feeding device 12 includes a stacking portion (elevation plate) 42 that is movable in the vertical direction, and a sheet feeding mechanism 52 serving as a sheet feeder. The sheet feeding device 13 includes a stacking portion (elevation plate) 43 that is movable in the vertical direction, and a sheet feeding mechanism 52 serving as a sheet feeder.

With reference to FIG. 1, a description is given of a basic image forming operation of the image forming apparatus 1.

The original document D is conveyed (fed) by conveyance rollers of the document conveyance device 10 from the document loading table in a direction indicated by arrow in FIG. 1, and then passes over the document reading device 2. While the original document D is passing over the document reading device 2, the document reading device 2 optically reads image data of the original document D passing over the document reading device 2.

The image data optically scanned by the document reading device 2 is converted into electrical signals. The electrical signals are then transmitted to the exposure device 3 serving as an optical writer. The exposure device 3 emits exposure light (laser light) L based on the image data of the electrical signals, toward the surface of the photoconductor drum 5 of the image forming device 4.

Meanwhile, while the photoconductor drum 5 rotates in a clockwise direction in FIG. 1, the image forming device 4 performs a predetermined series of image forming processes, such as a charging process, an exposing process, and a developing process, to form a toner image corresponding to the image data on the photoconductor drum 5. Thereafter, the toner image formed on the surface of the photoconductor drum 5 is transferred by the transfer device 7 serving as an image forming portion, onto the sheet P conveyed by the registration roller pair 17.

Now, a description is given of how the sheet P is conveyed to the transfer device 7 (image forming portion).

First, one of the sheet feeding devices 12 and 13 disposed inside the housing 1*a* of the image forming apparatus 1 is selected automatically or manually. For example, the lower sheet feeding device 13 is selected. Then, the sheet feeding mechanism 52 feeds the uppermost sheet P of the sheets P accommodated in the sheet feeding device 13, toward a sheet conveyance passage K. The uppermost sheet P (hereinafter, simply the sheet. P) passes through the sheet conveyance passage K, in which multiple sheet conveyance rollers including a sheet conveyance roller 59 are disposed, and then reaches the registration roller pair 17. When the sheet P reaches the registration roller pair 17, the registration roller pair 17 is stopped rotating. As the leading end of the sheet P contacts the nip region formed by the rollers of the registration roller pair 17, skew of the sheet P is corrected.

When the bypass sheet feeding device 16 that is disposed on one side of the image forming apparatus 1 is selected, the sheet P placed by a user on the bypass tray of the bypass sheet feeding device 16 is conveyed by the sheet feeding mechanism 52 (sheet feeder) toward the sheet conveyance passage K. When a plurality of sheets P are placed on the bypass tray of the bypass sheet feeding device 16, the uppermost sheet P is conveyed toward the sheet conveyance passage K. Then, when the sheet P reaches the registration roller pair 17, skew of the sheet P is corrected. Thereafter, the registration roller pair 17 starts rotating again, and the sheet P is then conveyed toward the transfer device 7 (image forming portion) in synchrony with movement of the toner image formed on the surface of the photoconductor drum 5 for forming the toner image on the sheet P at the correct position.

As described above, the registration roller pair 17 functions as a conveyance roller pair that corrects the skew of the sheet P as the leading end of the sheet P contacts the nip region between the rollers of the registration roller pair 17 while stopped, and then holds and conveys the deskewed sheet P in the nip region while the registration roller pair 17 is rotating. After the transfer device 7 transfers the toner image from the photoconductor drum 5 onto the sheet P in the transfer process, the sheet P is conveyed to the fixing device 20 along the sheet conveyance passage K. In the fixing device 20, the sheet P is conveyed between the fixing roller 21 and the pressure roller 22, so that the toner image is fixed to the sheet P by heat applied by the fixing roller 21 and pressure applied by the fixing roller 21 and the pressure roller 22, in the fixing process.

After the toner image is fixed to the sheet P in the fixing process, the sheet P passes a fixing nip region formed between the fixing roller 21 and the pressure roller 22. Then, the sheet P is ejected from the image forming apparatus 1 to be stacked as an output image on the sheet ejection tray 31. Thus, a series of the image forming processes is completed.

Next, a detailed description is given of the sheet feeding device according to the present embodiment.

Note that a description is given of the lower sheet feeding device 13 among the plurality of sheet feeding devices, i.e., the sheet feeding devices 12 and 13, included in the image forming apparatus 1. However, since the upper sheet feeding device 12 has the substantially same structure as the lower sheet feeding device 13 except the respective positions. For this reason, the description of the upper sheet feeding device 12 is omitted.

Figure 2:
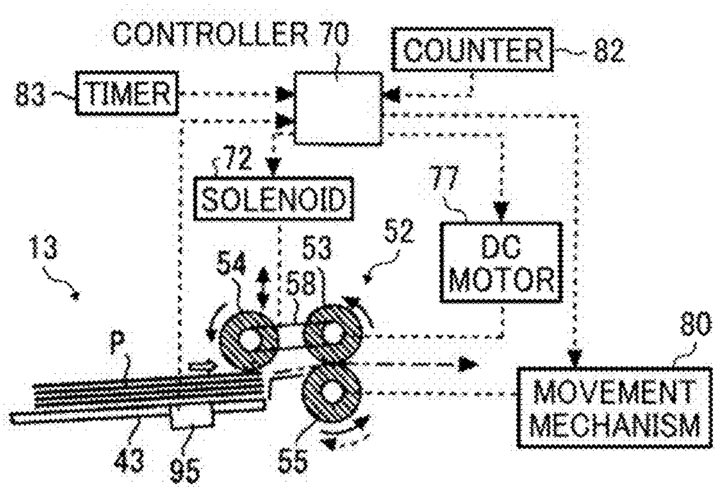
FIG. 2 is a schematic diagram illustrating a configuration of a sheet feeding device.

FIG. 2 is a schematic diagram illustrating a configuration of the sheet feeding device 13.

The sheet feeding device 13 includes a stacking portion 43 (elevation plate), and a sheet feeding mechanism 52. The stacking portion 43 stacks a plurality of sheets P. The sheet feeding mechanism 52 that functions as a sheet feeder feeds the sheets P stacked on the stacking portion 43. The stacking portion 43 rotates about a rotational center shaft 43*a* (see FIG. 1) in the normal and reverse directions to move in the vertical direction.

The sheet feeding mechanism 52 includes a sheet feed roller 53, a pickup roller 54, a sheet separation roller 55 that functions as a separator, a torque limiter 56, and a direct current (DC) motor 77 that functions as a drive source. The sheet feeding mechanism 52 further includes a contact-separation mechanism and a moving mechanism 80. The contact-separation mechanism brings the pickup roller 54 to contact or separate from the sheet P (uppermost sheet P1) stacked on the stacking portion 43. The moving mechanism 80 moves the sheet separation roller 55 in the width direction of the sheet P. The width direction of the sheet P is orthogonal to the sheet conveyance direction and the drawing sheet of FIG. 2.

The sheet feed roller 53 is disposed near the leading end of the sheets P stacked on the stacking portion 43 in the sheet conveyance direction (direction indicted by white arrow in FIG. 2). The sheet feed roller 53 rotates (in the counterclockwise direction in FIG. 2) along the sheet conveyance direction while contacting the upper face of the uppermost sheet P of the sheets P on the stacking portion 43, so that the sheet P is conveyed in the sheet conveyance direction indicated by the broken arrow in FIG. 2.

The pickup roller 54 rotates in the counterclockwise direction in FIG. 2 along the sheet conveyance direction while contacting the upper face of the uppermost sheet P stacked on the stacking portion 43, so that the sheet P is conveyed toward the sheet feed roller 53. The pickup roller 54 is capable of contacting and separating from the sheet P (uppermost sheet P1) stacked on the stacking portion 43. In other words, the pickup roller 54 is movable between a retracted position at which the pickup roller 54 does not contact the sheet P stacked on the stacking portion 43 (see FIG. 4B) and a contact position at which the pickup roller 54 contacts the sheet P as illustrated in FIG. 2.

The sheet separation roller 55 is disposed to form a nip region with the sheet feed roller 53. The sheet separation roller 55 functions as a separator that separates the sheets P (for example, the sheet P2) below the uppermost sheet P1 from the uppermost sheet P1, so that the uppermost sheet P1 alone is fed when a plurality of sheets P is nipped in the nip region formed between the sheet separation roller 55 and the sheet feed roller 53.

Specifically, when one sheet P is nipped in the nip region formed by the sheet separation roller 55 serving as a separator and the sheet feed roller 53, the sheet separation roller 55 rotates in the sheet conveyance direction, in other words, rotates in the clockwise direction indicated by a broken arrow in FIG. 2. When a plurality of sheets P are nipped in the nip region formed by the sheet separation roller 55 serving as a separator and the sheet feed roller 53, the sheet separation roller 55 rotates in the direction opposite to the sheet conveyance direction, in other words, rotates in the counterclockwise direction indicated by a solid arrow in FIG. 2. As a result, the uppermost sheet P1 of the plurality of sheets P is conveyed in the sheet conveyance direction along with the rotation of the sheet feed roller 53 while the second sheet P2 below the uppermost sheet P1 is conveyed in the direction opposite the sheet conveyance direction.

Each of the sheet feed roller 53, the pickup roller 54, and the sheet separation roller 55 has a roller portion including rubber material (or resin material) on the shaft, and the roller portion is a single unit or divided portions aligned along the axial direction of the shaft. Further, each roller portion of the sheet feed roller 53, the pickup roller 54, and the sheet separation roller 55 is detachably attachable (replaceable) to the shaft of each of the sheet feed roller 53, the pickup roller 54, and the sheet separation roller 55, so that maintenance of the roller portion is easily performed.

The DC motor 77 functioning as a drive source is feedback-controlled so that the rotational speed of the motor shaft is to be a predetermined value. Specifically, the controller 70 performs the pulse width modulation (PWM) control to adjust the current (or voltage) applied to the DC motor 77, so that the number of rotations of the DC motor 77 remains constant regardless of the load variation influence. To be more specific, when a relatively large amount of load is applied on the DC motor 77, the controller 70 adjusts to apply a relatively large amount of current (or voltage) to the DC motor 77. When a relatively small amount of load is applied on the DC motor 77, the controller 70 adjusts to apply a relatively small amount of current (or voltage) to the DC motor 77. Thus, the DC motor 77 achieves the constant number of rotations.

In the sheet feeding device 13, the stacking portion 43 moves in the vertical direction depending on the number of sheets P stacked on the stacking portion 43 so that the pickup roller 54 contacts the uppermost sheet P1 placed on top of the sheets P stacked on the stacking portion 43. Then, the sheet feeding operation of the sheets P starts after the pickup roller 54 is lowered to a position where the pickup roller 54 contacts the upper face of the uppermost sheet P1 on the sheets P stacked on the stacking portion 43 that is located at the vertically adjusted position.

An inlet guide plate is disposed between the stacking portion 43 and the nip region formed between the sheet feed roller 53 and the sheet separation roller 55. The sheet feeding device 13 includes side fences that restrict the position in the width direction of the sheet P stacked on the stacking portion 43. The width direction is a direction orthogonal to the drawing sheet of FIG. 2. The side fences of the sheet feeding device 13 are disposed at both lateral ends, in other words, at both ends in the width direction of the sheet P, so that the side fences sandwich the sheet P. Due to such a configuration, a manual movement mechanism such as the side fences moves the sheet P in the width direction in accordance with the lateral length of the sheet P.

The sheet feeding device 13 includes an end fence that restricts the position of the sheet P stacked on the stacking portion 43, in the sheet conveyance direction. The sheet conveyance direction is left and right directions in FIG. 2. The end fence of the sheet feeding device 13 is disposed to contact the trailing end of the sheet P in the sheet conveyance direction. Due to such a configuration, the manual movement mechanism such as the end fence moves the sheet P in the sheet conveyance direction in accordance with the longitudinal length of the sheet P.

Figure 3:
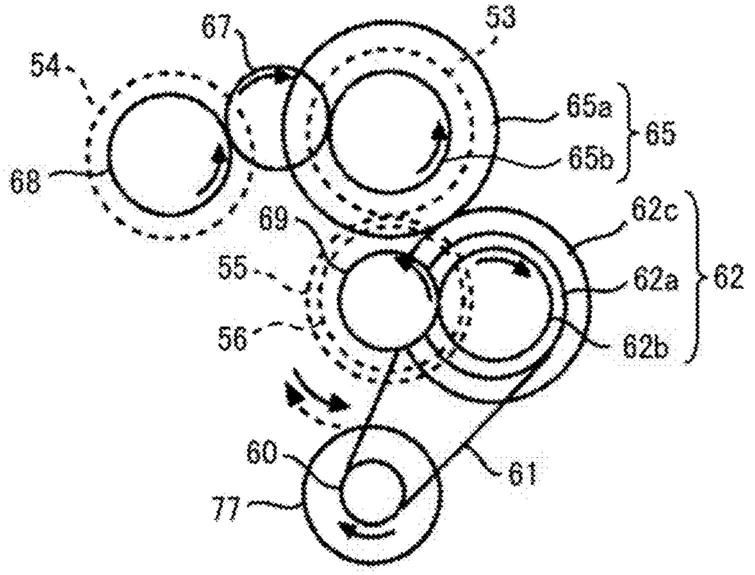
FIG. 3 is a schematic diagram illustrating a configuration of a driving mechanism of the sheet feeding device.

FIG. 3 is a schematic diagram illustrating a driving mechanism of the sheet feeding device 13.

As illustrated in FIG. 3, the sheet feed roller 53 includes a two-step gear 65 having an upper gear 65*a* and a lower gear 65*b*. The two-step gear 65 is mounted on the shaft of the sheet feed roller 53. The upper gear 65*a* of the two-step gear 65 meshes with a second gear 62*c* of a two-step pulley gear 62. The lower gear 65*b* of the two-step gear 65 meshes with an idler gear 67. The idler gear 67 meshes with a gear 68 mounted on the shaft of the pickup roller 54.

A first gear 62*b* of the two-step pulley gear 62 meshes with a separation gear 69 mounted on the shaft of the sheet separation roller 55. A torque limiter 56 is mounted on the shaft of the sheet separation roller 55. A motor pulley 60 is attached to the DC motor 77 (drive motor). A timing belt 61 is wound with tension around the motor pulley 60 and a pulley 62*a* of the two-step pulley gear 62.

The driving force is transmitted from the DC motor 77 to the separation gear 69 via the motor pulley 60, the timing belt 61, the pulley 62*a* and the first gear 62*b*. The driving force from the separation gear 69 is transmitted to or interrupted by the sheet separation roller 55 via the torque limiter 56.

When the running torque (rotational load) exceeding the predetermined value is applied to the sheet separation roller 55, the sheet separation roller 55 idles relative to the torque limiter 56. When one sheet P or no sheet is nipped in the nip region (contact portion) formed between the sheet feed roller 53 and the sheet separation roller 55, the rotational load applied to the sheet separation roller 55 is relatively large. In order to adjust the rotational load, the torque limiter 56 interrupts drive transmission from the DC motor 77 to the sheet separation roller 55. For this reason, the sheet separation roller 55 idles relative to the torque limiter 56 and is rotated along with rotation of the sheet feed roller 53 in the clockwise direction in FIG. 3.

When a plurality of sheets P is nipped in the nip region, the rotational load applied to the sheet separation roller 55 is relatively small due to slippage of the sheets P. For this reason, the torque limiter 56 transmits the driving force from the DC motor 77 to the sheet separation roller 55. As a result, the sheet separation roller 55 rotates in the counterclockwise direction in FIG. 3. By so doing, the sheets P of the plurality of sheets nipped in the nip region below the uppermost sheet P1 are conveyed in the direction opposite the sheet conveyance direction to return to the stacking portion 43. Due to such a configuration, one sheet P is fed in the sheet feeding direction (sheet conveyance direction) without causing multifeeding error in which multiple sheets P are fed from the nip region formed between the sheet feed roller 53 and the sheet separation roller 55.

The driving force transmitted from the DC motor 77 to the two-step pulley gear 62 is further transmitted to the upper gear 65*a* of the two-step gear 65 via the second gear 62*c*, so that the sheet feed roller 53 is driven and rotated in the counterclockwise direction in FIG. 3. Further, the driving force is transmitted to the gear 68 via the lower gear 65*b* of the two-step gear 65 and the idler gear 67, so that the pickup roller 54 is driven and rotated in the counterclockwise direction in FIG. 3.

Figure 4A:
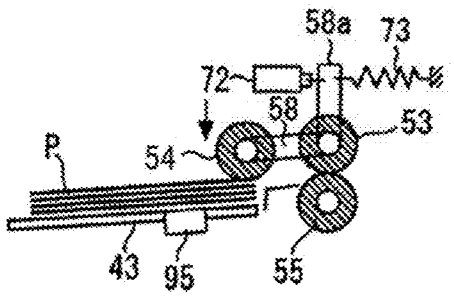
FIGS. 4A and 4B are schematic diagrams, each illustrating an operation of a contact-separation mechanism of a pickup roller in the sheet feeding device.
Figure 4B:
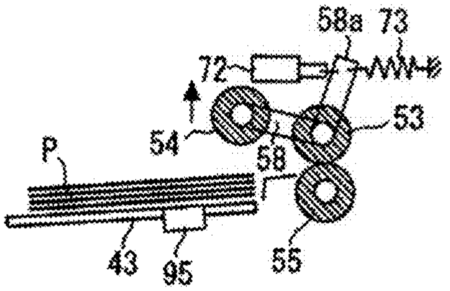

FIGS. 4A and 4B are schematic diagrams each illustrating an operation of a contact-separation mechanism of the pickup roller 54 in the sheet feeding device 13.

The pickup roller 54 is rotatably held by an arm 58. The arm 58 is rotatably held by the rotary shaft of the sheet feed roller 53. A spring 73 and a solenoid 72 are coupled to a protrusion 58*a* of the arm 58. The spring 73 biases so that the pickup roller 54 moves to the retracted position. The solenoid 72 moves the pickup roller 54 to the contact position against the biasing force of the spring 73.

As the controller 70 (see FIG. 2) turns on the solenoid 72, the pickup roller 54 moves to the contact position as illustrated in FIG. 4A. When the controller 70 turns off the solenoid 72, the pickup roller 54 moves to the retracted position as illustrated in FIG. 48. Note that the idler gear 67 described above with reference to FIG. 3 is disposed on the arm 58, and then rotates together with the arm 58 while maintaining the meshing with the gear 68 of the pickup roller 54 and the meshing state with the lower gear 65*b* of the sheet feed roller 53.

When the sheet P is not set on the stacking portion 43, an end detection sensor 95 detects the state. In response to the detection, the controller 70 (see FIG. 2) controls the solenoid 72 to move the pickup roller 54 to the retracted position (see FIG. 4B). When the sheet P is set on the stacking portion 43, the end detection sensor 95 detects the state. In response to the detection, the controller 70 controls the solenoid 72 to move the pickup roller 54 from the retracted position toward the contact position (see FIG. 4A).

Then, the pickup roller 54 starts to rotate in the counterclockwise direction while the pickup roller 54 is in contact with the upper face of the uppermost sheet P1 of the sheets P stacked on the stacking portion 43. In synchrony with this movement, the sheet feed roller 53 and the sheet separation roller 55 start to rotate. As a result, the uppermost sheet P1 of the sheets P stacked on the stacking portion 43 is fed by the pickup roller 54 to be conveyed toward the nip region between the sheet feed roller 53 and the sheet separation roller 55. Further, one sheet P is separated and conveyed from the nip region toward the image forming device 4.

When the sheets P stacked on the stacking portion 43 are totally conveyed and no sheet is left on the stacking portion 43, the state of the stacking portion 43 is detected by the end detection sensor 95. When the end detection sensor 95 detects that no sheet is set on the stacking portion 43, the controller 70 controls the solenoid 72 to move the pickup roller 54 to the retracted position again (see FIG. 4B).

FIGS. 5A, 5B, 5C, and 5D are schematic diagrams each illustrating an operation of the sheet feeding device 13. Each of FIGS. 5A, 5B, 5C, and 5D illustrates the operation performed when the plurality of sheets P are nipped in the nip region.

Figure 5A:
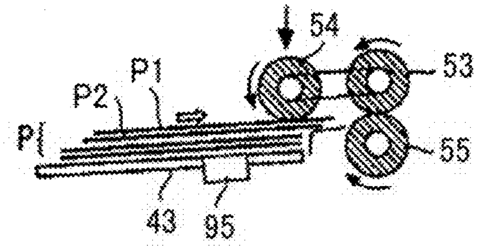
FIGS. 5A, 5B, 5C, and 5D are schematic diagrams, each illustrating an operation of the sheet feeding device.

First, as illustrated in FIG. 5A, when the sheets P are set on the stacking portion 43, the stacking portion 43 ascends to an appropriate position. Then, the controller 70 (see FIG. 2) controls the solenoid 72 to move the pickup roller 54 from the retracted position to the contact position. Then, the pickup roller 54 contacts the upper face of the uppermost sheet P1 of the plurality of sheets P stacked on the stacking portion 43. While the pickup roller 54 contacts the upper face of the uppermost sheet P1, the pickup roller 54 starts rotating in the counterclockwise direction. Then, the uppermost sheet P1 and the second sheet P2 placed on the stacking portion 43 are conveyed by the pickup roller 54 toward the nip region formed between the sheet feed roller 53 and the sheet separation roller 55. Now, a description is given of a case when the uppermost sheet P1 and the second sheet P2 are fed together (multiple feeding). When the uppermost sheet P1 and the second sheet P2 are not nipped in the nip region, the torque limiter 56 idles and the sheet separation roller 55 rotates in the clockwise direction.

Figure 5B:
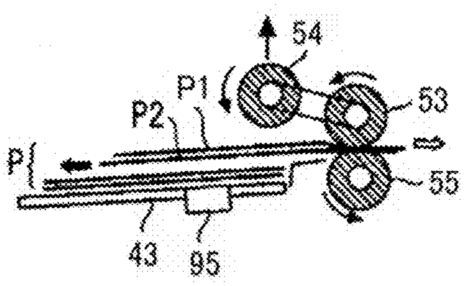
Figure 5C:
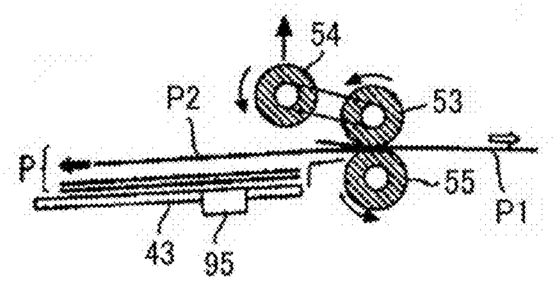

As illustrated in FIG. 5B, when the uppermost sheet P1 and the second sheet P2 fed together are conveyed to the nip region (multiple feeding), the pickup roller 54 moves to the retracted position again. As the uppermost sheet P1 and the second sheet P2 are nipped in the nip region, the torque limiter 56 is interlocked and the sheet separation roller 55 starts rotating in the counterclockwise direction. As the sheet separation roller 55 rotates in the counterclockwise direction, the second sheet P2 is conveyed in the direction indicated by black arrow, along with rotation of the sheet separation roller 55, in other words, the lower sheet (second sheet P2) is returned to the stacking portion 43, as illustrated in FIG. 5C. The upper sheet (uppermost sheet P1) is conveyed in the direction indicted by white arrow, along with rotation of the sheet feed roller 53, in other words, the upper sheet P1 is conveyed toward the sheet conveyance passage K in the image forming apparatus 1.

Figure 5D:
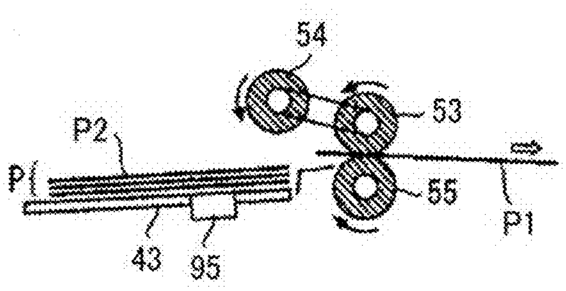

As illustrated in FIG. 5D, after the sheet separation roller 55 returns the lower sheet (second sheet) P2 toward the stacking portion 43, the lower sheet P2 passes through the nip region. Then, the torque limiter 56 idles again, and the sheet separation roller 55 rotates in the clockwise direction again.

When one sheet P is nipped in the nip region after the operation of FIG. 5A, the sheet separation roller SS does not rotate in the counterclockwise direction as illustrated in FIGS. 5B and 5C, but the uppermost sheet P1 is conveyed in the direction indicted by white arrow while the sheet separation roller 55 is rotated in the clockwise direction, as illustrated in FIG. 5D.

Figure 6:
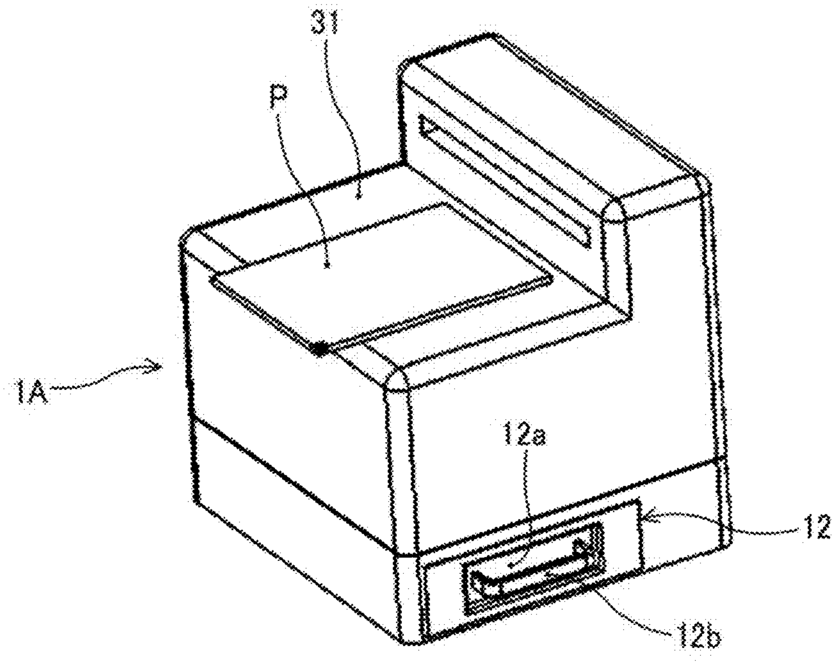
FIG. 6 is a perspective view of an image forming apparatus having a configuration different from the image forming apparatus of FIG. 1.

FIG. 6 is a perspective view of an image forming apparatus having another configuration different from the image forming apparatus 1 of FIG. 1.

An image forming apparatus 1A illustrated in FIG. 6 does not include the document reading device 2 and the document conveyance device 10. The upper face of the housing of the image forming apparatus 1A functions as the sheet ejection tray 31 that stacks ejected sheets each having an image on the surface. Moreover, the image forming apparatus 1A includes one sheet feeding device 12 while the image forming apparatus 1 of FIG. 1 includes the sheet feeding devices 12 and 13.

Figure 7:
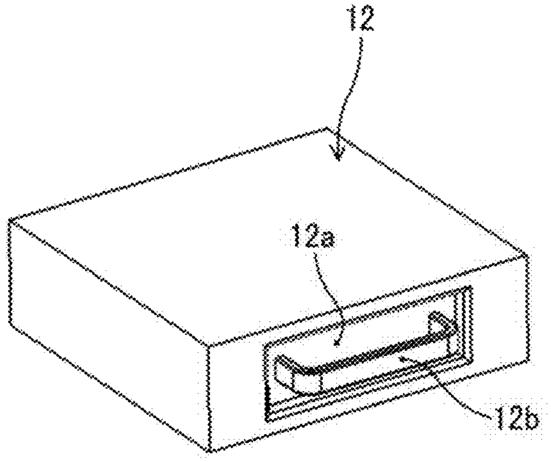
FIG. 7 is a perspective view of a sheet feeding device included in the image forming apparatus of FIG. 6.

FIG. 7 is a perspective view of the sheet feeding device 12 included in the image forming apparatus 1A of FIG. 6.

As illustrated in FIG. 7, the sheet feeding device 12 that functions as a drawer device includes a sheet tray 12*a* and a handle 12*b*. The sheet tray 12*a* functions as a sheet container and a drawer drawable from to the housing of the image forming apparatus 1A. The handle 12*b* is attached on one side of the sheet tray 12*a*. When the sheet tray 12*a* runs out of sheets, the sheet tray 12*a* is drawn (detached) from the sheet feeding device 12 to replenish new sheets in the sheet tray 12*a*. As a user grips and pulls the handle 12*b*, the sheet tray 12*a* is drawn from the sheet feeding device 12. When the sheets are replenished in the sheet tray 12*a*, the user grips and pushes the handle 12*b*, so that the sheet tray 12*a* is pushed into the sheet feeding device 12.

The sheet tray 12*a* is drawn (detached) from the sheet feeding device 12 when the sheet tray 12*a* runs out of sheets while the printing is being performed or when paper jam occurs. This operation of drawing the sheet tray 12*a* is usually performed by a user having instructed the print job of the image. When performing this operation, the handle 12*b* of the sheet tray 12*a* may be gripped by an unspecified number of users. For this reason, if the handle 12*b* is gripped by a user by the hand on which virus is attached, the virus may be attached to the handle 12*b*, and contact infection in which virus is infected to another user via the handle 12*b* may occur.

In order to address this inconvenience, in the present embodiment, an operation assisting tool is used to draw the sheet tray 12*a* without directly touching the handle 12*b* of the sheet tray 12*a*. Now, a detailed description is given of the drive device 50 of the pressure adjustment mechanism 40 according to the present embodiment of this disclosure, with reference to FIGS. 5, 6, 7 and 8.

Figure 8A:
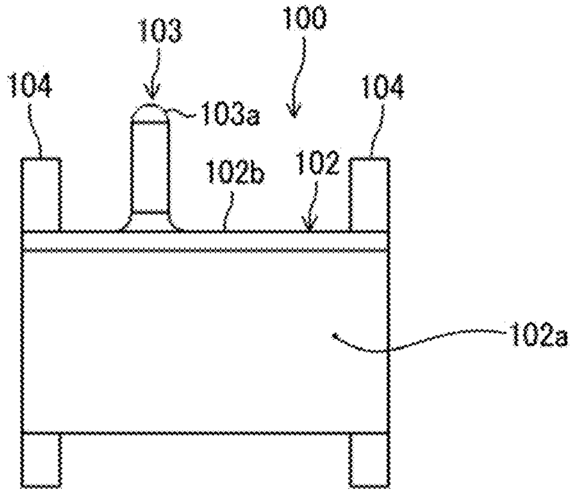
FIGS. 8A, 8B, and 8C are schematic diagrams, each illustrating an operation assisting tool according to an embodiment of the present embodiment.
Figure 8B:
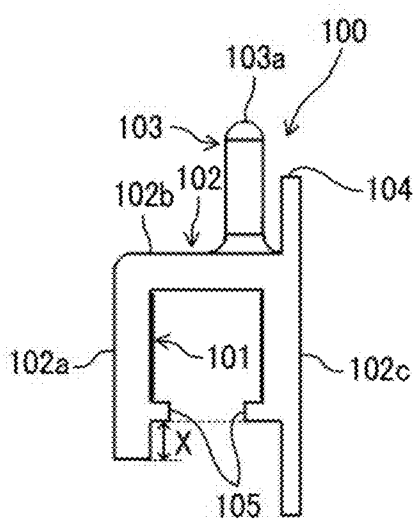
Figure 8C:
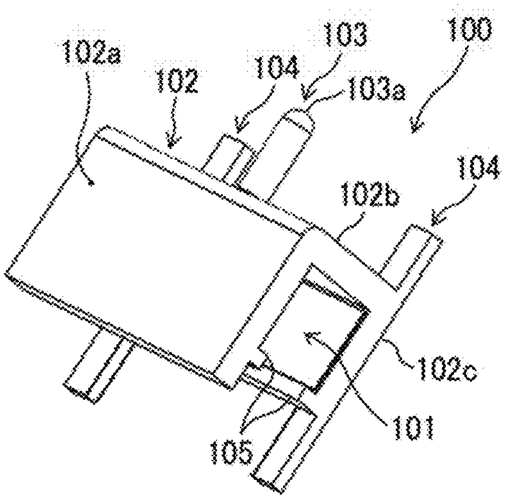

FIGS. 8A, 8B, and 8C are schematic diagrams each illustrating an operation assisting tool 100 according to an embodiment of the present embodiment. Specifically, FIG. 8A is a front view of the operation assisting tool 100, FIG. 8B is a side view of the operation assisting tool 100, and FIG. 8C is a perspective view of the operation assisting tool 100.

The operation assisting tool 100 is owned by each user using this image forming apparatus.

As illustrated in FIGS. 8A, 8B, and 8C, the operation assisting tool 100 has an arc portion with the lower portion being opened. The inner circumferential surface of the arc portion of the operation assisting tool 100 is an engagement portion 101 that engages with the handle 12*b*, and the outer circumferential surface of the arc portion of the operation assisting tool 100 is a gripper 102 that is gripped by a user. The engagement portion 101 has a first face 101*a* and a second face 101*b* each being orthogonal to a drawing direction (moving direction) of the sheet tray 12*a*. Stoppers 105 in pair are disposed projecting toward each other, at lower portions of the first face 101*a* and the second face 101*b* of the engagement portion 101.

The distance between the stoppers 105 is sufficiently greater than the thickness of the handle 12*b*.

As described below, a panel operation portion 103 that is used to operate a control panel 200 (see FIG. 11) is attached on an upper face 102*b* of the gripper 102. The panel operation portion 103 has a tip portion 103*a* that functions as a pressing portion. The tip portion 103*a* is made of an elastic material with which a touch screen is operable. The panel operation portion 103 is formed by a material different from the body of the operation assisting tool 100. The tip portion 103*a* of the panel operation portion 103 is attached by a known method such as press-fitting, bonding, or screwing. Further, the tip portion 103*a* of the panel operation portion 103 is attached to the body of the operation assisting tool 100. By so doing, the tip portion 103*a* of the panel operation portion 103 is easily detached from the body of the operation assisting tool 100. Due to such a structure, the tip portion 103*a* is preferably replaceable. As the tip portion 103*a* of the panel operation portion 103 is replaceable, if the tip portion 103*a* is damaged or broken, the operation assisting tool 100 is continuously used by simply replacing the tip portion 103*a*.

Note that the whole panel operation portion 103 may be made of a material different from the body of the operation assisting tool 100.

Moreover, the gripper 102 includes a fingertip contact face 102*c* that contacts the fingertip of a user when the user grips the operation assisting tool 100. The operation assisting tool 100 further includes rotation stoppers 104 extending in the vertical direction. The rotation stoppers 104 are disposed at both lateral ends (both ends in the width direction) of the upper and lower ends of the fingertip contact face 102*c* of the gripper 102, to face the side face of the sheet tray 12*a* of the sheet feeding device 12. The rotation stoppers 104 contact a side panel 12*c* (see FIGS. 9A and 9B) of the sheet feeding device 12 to stop the operation assisting tool 100 from rotating about the handle 12*b*.

As illustrated in FIG. 8B, the gripper 102 further includes a palm contact face 102*a* outside the handle 12*b*. The palm contact face 102*a* of the gripper 102 contacts the palm of a user when the user grips the gripper 102. The palm contact face 102*a* is longer by X mm in the downward direction than the fingertip contact face 102*c*.

Preferably, the operation assisting tool 100 is made of a material that is subjected to antibacterial treatment or a metallic material. Such antibacterial treatment may use a special material in which silver ions are kneaded into a resin or may use any material or treatment having sterilization, disinfection, and antibacterial effects. Such metallic material may include, for example, copper, copper alloy, aluminum, and aluminum alloy safely. Copper and copper alloy are more preferable since these metallic materials have a bactericidal effect. The operation assisting tool 100 made of a material that is subjected to antibacterial treatment or a metallic material prevents contact infection of virus via the operation assisting tool 100. Further, since a user grips the gripper 102, the gripper 102 alone may be made of a material that is subjected to antibacterial treatment or a metallic material.

Further, the engagement portion 101 in the configuration illustrated in FIGS. 8A to 8D is made with the gripper 102 as a single unit. However, the engagement portion 101 and the gripper 102 may be made of different materials. By making the engagement portion 101 and the gripper 102 of different materials, the engagement portion 101 may be made of a material appropriate for engagement with the handle 12*b* and the gripper 102 may be made of a material appropriate for gripping by a user. As a result, the operability and functionality of the operation assisting tool 100 are enhanced.

For example, the engagement portion 101 is made of a material having a high friction coefficient such as ethylene propylene diene monomer (EPDM) or silicon rubber, and the friction coefficient of the engagement portion 101 with respect to the handle 12*b* is set to be higher than the friction coefficient of the gripper 102 with respect to the handle 12*b*. Moreover, the gripper 102 is made of a material that is subjected to antibacterial treatment or a metallic material, as described above. The engagement portion 101 made of a material having a high friction coefficient prevents the operation assisting tool 100 from moving about the handle 12*b* when operating with the handle 12*b*. This configuration contributes to preferable pulling and pushing of the sheet tray 12*a* with respect to the sheet feeding device 12. The gripper 102 made of a material that is subjected to antibacterial treatment or a metallic material preferably prevents contact infection of virus via the gripper 102.

The engagement portion 101 is attached to (the arc portion of) the gripper 102 by a known method such as press-fitting, bonding, or screwing. Preferably, the engagement portion 101 is detachably attached to the gripper 102 (arc portion) by screwing or by press-fitting, so that the engagement portion 101 are replaceable. Since the engagement portion 101 is replaceable, if the engagement portion 101 is damaged or broken, the operation assisting tool 100 is continuously used by simply replacing the engagement portion 101.

Figure 9A:
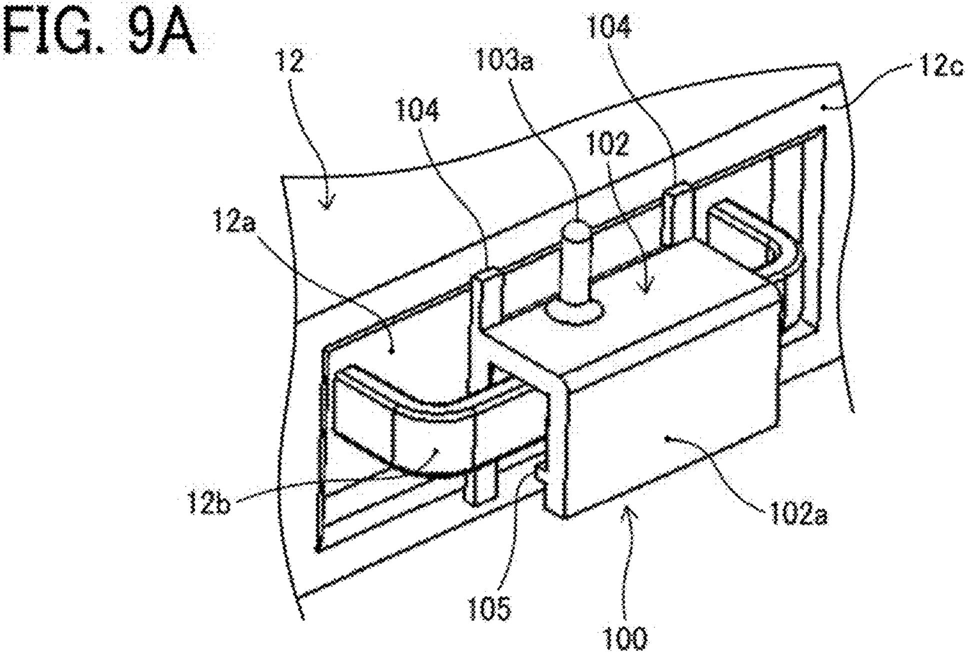
FIGS. 9A and 9B are schematic diagrams, each illustrating the operation assisting tool attached to a handle.
Figure 9B:
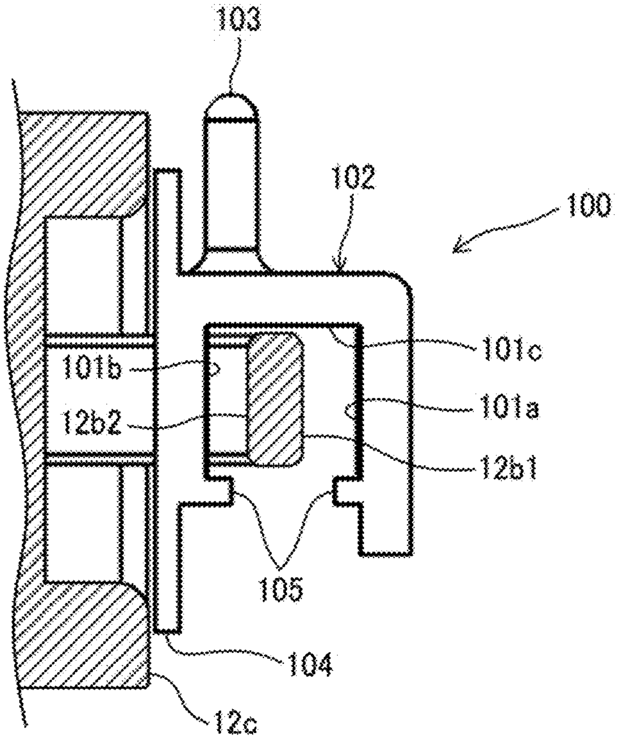

FIGS. 9A and 9B are schematic diagrams each illustrating the operation assisting tool 100 attached to the handle 12*b*. Specifically, FIG. 9A is a perspective view of the operation assisting tool 100, and FIG. 9B is a cross-sectional view of the operation assisting tool 100.

The operation assisting tool 100 is attached to the handle 12*b* by inserting the handle 12*b* into the engagement portion 101 from above. Since the distance between the stoppers 105 is sufficiently greater than the thickness of the handle 12*b*, the handle 12*b* is not caught by the stoppers 105 and is safely inserted into the engagement portion 101 when the operation assisting tool 100 is attached to the handle 12*b*.

As the operation assisting tool 100 is attached to the handle 12*b*, the first face 101*a* of the engagement portion 101 comes to face the outer circumferential face 12*b*1 of the handle 12*b* and a second face 101*b* of the engagement portion 101 comes to face the inner circumferential face 12*b*2 of the handle 12*b*. Further, the upper face 101*c* of the engagement portion 101 contacts the upper face of the handle 12*b*, so that the operation assisting tool 100 is supported by the handle 12*b*. When the operation assisting tool 100 is attached to the handle 12*b*, the stoppers 105 formed in pair are located at a position lower than the position of the handle 12*b*.

Further, as the operation assisting tool 100 is attached to the handle 12*b*, the tip portion of each of the rotation stoppers 104 comes to face the side panel 12*c* of the sheet feeding device 12. When the operation assisting tool 100 is to rotate in the clockwise direction in FIG. 9B, the tip portion of the lower rotation stopper 104 contacts the side panel 12*c* of the sheet feeding device 12, which restricts rotation of the operation assisting tool 100 about the handle 12*b*. When the operation assisting tool 100 is to rotate in the counterclockwise direction in FIG. 9B, the tip portion of the upper rotation stopper 104 contacts the side panel 12*c* of the sheet feeding device 12, which restricts rotation of the operation assisting tool 100 about the handle 12*b*.

As described above, the rotation stoppers 104 restrict rotation of the operation assisting tool 100. By so doing, the operation assisting tool 100 is maintained at the position at which the handle 12*b* is pulled as illustrated in FIG. 9B. As a result, the operation assisting tool 100 attached to the handle 12*b* is easily gripped. Moreover, the sheet tray 12*a* is pulled out without changing the position of the operation assisting tool 100, and the sheet tray 12*a* is easily drawn (detached) from the sheet feeding device 12.

Figure 10A:
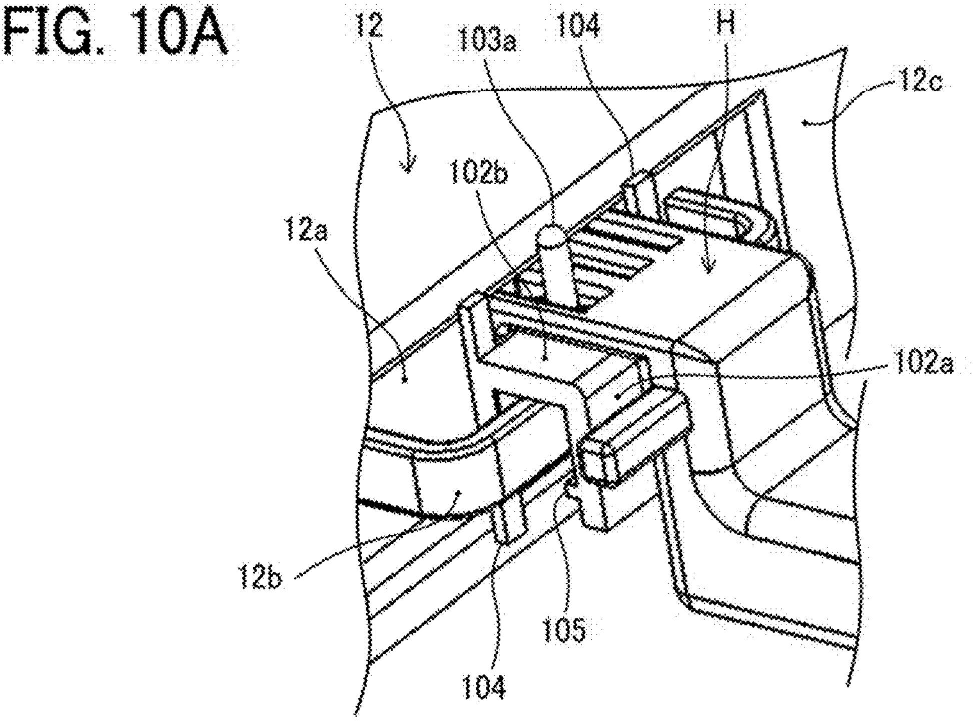
FIGS. 10A and 10B are schematic diagrams, each illustrating an operation of pulling a sheet tray from the sheet feeding device, using the operation assisting tool.
Figure 10B:
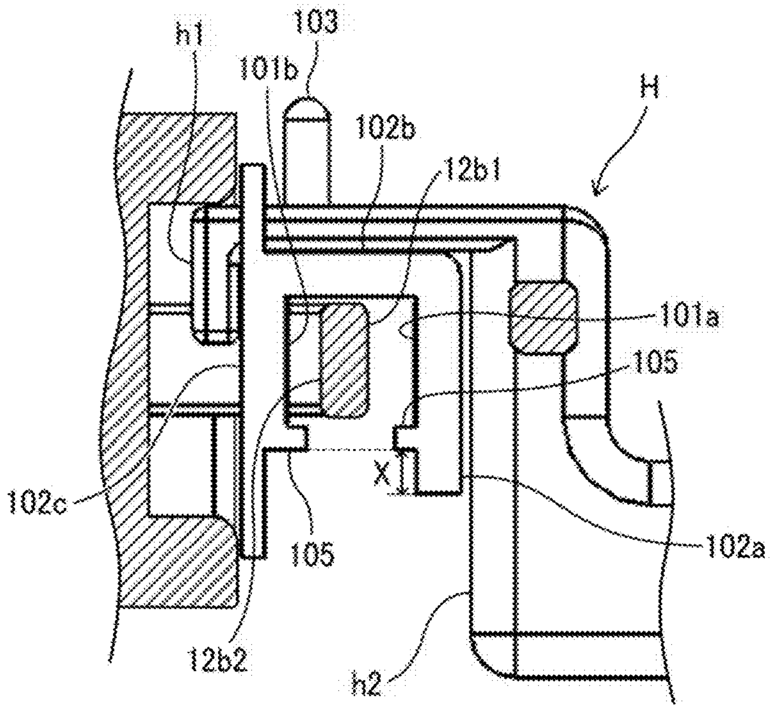

FIGS. 10A and 10B are schematic diagrams each illustrating an operation of pulling the sheet tray 12*a* from the sheet feeding device 12, using the operation assisting tool 100. Specifically, FIG. 10A is a perspective view of pulling the sheet tray 12*a* using the operation assisting tool 100, and FIG. 10B is a cross-sectional view of pulling the sheet tray 12*a* using the operation assisting tool 100.

When the sheet tray 12*a* is pulled (drawn), the user attaches the operation assisting tool 100 that is owned by the user, to the handle 12*b*. As illustrated in FIGS. 10A and 10B, as the user grips the gripper 102 of the operation assisting tool 100 by the hand H, the fingertip h1 of the user contacts the fingertip contact face 102*c* of the gripper 102 and the palm h2 of the user contacts the palm contact face 102*a* of the gripper 102.

Further, the operation assisting tool 100 according to the present embodiment includes a panel operation portion 103 on the upper face 102*b* of the gripper 102. Due to this configuration, as illustrated in FIG. 10A, the user grips the gripper 102 by nipping the panel operation portion 103 with the fingers of the user. As a result, the operation assisting tool 100 is prevented from moving in the width direction with respect to the hand H of the user, so that the user firmly grips the operation assisting tool 100. As a result, the operability of pulling and pushing the sheet tray 12*a* with the operation assisting tool 100 are enhanced.

As illustrated in FIG. 10B, when the user grips the gripper 102 by the hand H, the palm h2 is at a position lower than the position of the fingertip h1. In the present embodiment, the palm contact face 102*a* of the gripper 102 where the palm h2 of the user contacts is extended longer by X mm in the downward direction than the fingertip contact face 102*c* of the gripper 102. By so doing, the contact area where the palm h2 of a user contacts the palm contact face 102*a* is greater (wider) as compared with a case where the lower end of the palm contact face 102*a* is at the same position as the lower end of the fingertip contact face 102*c*. As a result, the user stably grips the gripper 102 and stably pulls and pushes the sheet tray 12*a* with the operation assisting tool 100.

As the user grips and pulls the gripper 102 of the operation assisting tool 100, the second face 101*b* of the engagement portion 101 contacts the inner circumferential face 12*b*2 of the handle 12*b*, so that the pulling force of the user is transmitted to the handle 12*b* via the second face 101*b* of the engagement portion 101. As a result, the sheet tray 12*a* is pulled out from the sheet feeding device 12.

In the present embodiment, as the operation assisting tool 100 is attached to the handle 12*b*, the second face 101*b* of the engagement portion 101 comes to face the inner circumferential face 12*b*2 of the handle 12*b*. Due to such a configuration, the user does not change the position of the operation assisting tool 100 but grips and pulls the gripper 102, so that the second face 101*b* of the engagement portion 101 contacts the inner circumferential face 12*b*2 of the handle 12*b*.

Further, as the sheet tray 12*a* is pulled from the sheet feeding device 12 while the second face 101*b* of the engagement portion 101 contacts the inner circumferential face 12*b*2 of the handle 12*b*, each of the stoppers 105 on the second face 101*b* faces the handle 12*b* from below. Depending on how the user pulls the sheet tray 12*a*, force may be generated to rotate the operation assisting tool 100 in the clockwise direction in FIG. 10B when the sheet tray 12*a* is pulled (detached) from the sheet feeding device 12. When the force to rotate the operation assisting tool 100 in the clockwise direction in FIG. 10B is generated when the sheet tray 12*a* is pulled out, the stoppers 105 on the second face 101*b* of the engagement portion 101 contact the lower face of the handle 12*b*. According to this configuration, rotation of the operation assisting tool 100 is restricted, so that the operation assisting tool 100 is preferably prevented from coming off from the handle 12*b* while the sheet tray 12*a* is being pulled, and the sheet tray 12*a* is stably drawn (detached) from the sheet feeding device 12.

As the sheet tray 12*a* is pushed into the sheet feeding device 12, the first face 101*a* of the engagement portion 101 contacts the outer circumferential face 12*b*1 of the handle 12*b*, so that the pushing force of the user is transmitted to the handle 12*b* via the first face 101*a* of the engagement portion 101. As a result, the sheet tray 12*a* is pushed (attached) into the sheet feeding device 12.

In the present embodiment, as the operation assisting tool 100 is attached to the handle 12*b*, the outer circumferential face 12*b*1 of the handle 12*b* comes to face the first face 101*a* of the engagement portion 101. Due to such a configuration, the user does not change the position of the operation assisting tool 100 but grips and pushes the gripper 102, so that the first face 101*a* of the engagement portion 101 contacts the outer circumferential face 12*b*1 of the handle 12*b*.

Further, as the sheet tray 12*a* is pushed into the sheet feeding device 12 while the first face 101*a* of the engagement portion 101 contacts the outer circumferential face 12*b*1 of the handle 12*b*, each of the stoppers 105 on the first face 101*a* faces the handle 12*b* from below. Depending on how the user pushes the sheet tray 12*a*, force may be generated to rotate the operation assisting tool 100 in the counterclockwise direction in FIG. 10B when the sheet tray 12*a* is pushed (attached) into the sheet feeding device 12. In a case where force is generated to rotate the operation assisting tool 100 in the counterclockwise direction in FIG. 10B when the sheet tray 12*a* is pushed into the sheet feeding device 12, the stoppers 105 on the first face 101*a* of the engagement portion 101 contact the lower face of the handle 12*b*. As a result, rotation of the operation assisting tool 100 is restricted, so that the operation assisting tool 100 is preferably prevented from coming off from the handle 12*b* while the sheet tray 12*a* is being pushed, and the sheet tray 12*a* is stably pushed into the sheet feeding device 12.

As the sheet tray 12*a* is pushed until the rotation stoppers 104 of the operation assisting tool 100 contact the side panel 12*c* of the sheet feeding device 12, the sheet tray 12*a* is automatically inserted into the sheet feeding device 12 due to the configuration of the sheet feeding device 12. As a result, the sheet tray 12*a* is attached to the sheet feeding device 12, as illustrated in FIG. 10B.

In a case where the operation assisting tool is applied to a sheet feeding device 12 in which the sheet tray 12*a* is to be attached to the sheet feeding device 12 only when the sheet tray 12*a* is inserted to the far end of the sheet feeding device 12, the operation assisting tool may not include the rotation stoppers 104. By removing the rotation stoppers 104 from the operation assisting tool, the sheet tray 12*a* is pushed to the far end of the sheet feeding device 12 with the operation assisting tool 100, so that the sheet tray 12*a* is attached to the sheet feeding device 12.

Further, the rotation stoppers 104 may be elastically deformable to push the sheet tray 12*a* to the far end of the sheet feeding device 12 using the operation assisting tool 100. As the operation assisting tool 100 is further pushed while the rotation stoppers 104 contact the side panel 12*c* of the sheet feeding device 12, the rotation stoppers 104 are elastically deformed, so that the sheet tray 12*a* is pushed to the far end of the sheet feeding device 12.

According to this configuration, in the present embodiment, the user pulls or pushes the sheet tray 12*a* without directly touching the handle 12*b*, and then contact infection of virus via the handle (for example, the handle 12*b*) of the sheet tray is prevented.

Further, the operation assisting tool 100 according to the present embodiment includes the gripper 102 that corresponds to the outer circumferential surface of the arc portion to which the handle 12*b* is inserted. By so doing, the gripper 102 is made greater than the handle 12*b* and is easy to grip as compared with the case where the handle 12*b* is gripped. As a result, the force is applied more easily and the operation with the operation assisting tool 100 is performed stably.

Figure 11:
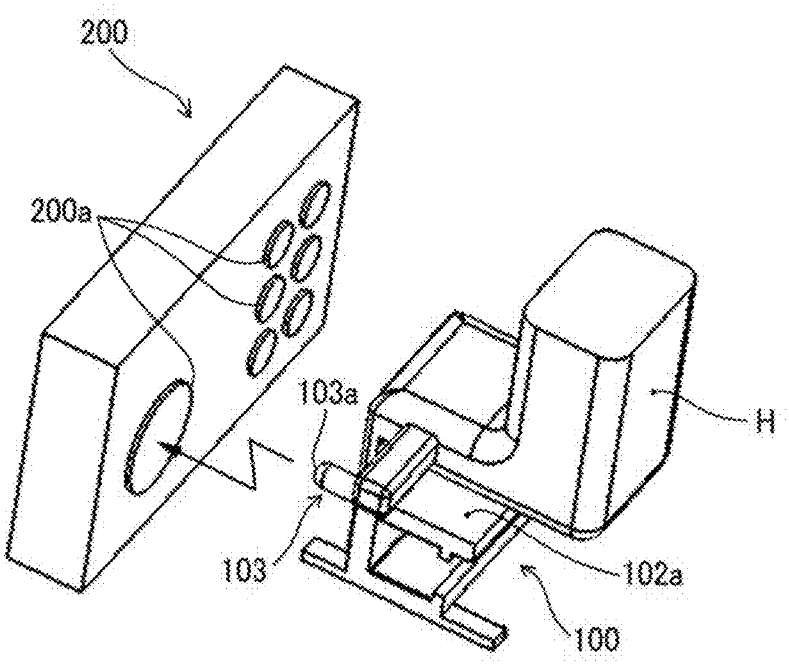
FIG. 11 is a diagram illustrating operation of a control panel using the operation assisting tool according to the present embodiment.

FIG. 11 is a diagram illustrating the operation of the control panel 200 using the operation assisting tool 100 according to the present embodiment.

As in the case where the sheet tray 12*a* is pulled out, the operation assisting tool 100 is gripped when operating the control panel 200 with the operation assisting tool 100. The control panel 200 is operated by pressing any of buttons 200*a* of the control panel 200 with the tip portion 103*a* of the panel operation portion 103.

Since the control panel 200 of the image forming apparatus is touched by an unspecified number of users for setting image quality or setting the number of print sheets, it is highly likely that virus is attached to the control panel 200. In the present embodiment, the control panel 200 is operated by using the operation assisting tool 100 without directly touching the control panel 200. As a result, contact infection via the control panel 200 is prevented.

Next, a description is given of a modification of the operation assisting tool.

Figure 12:
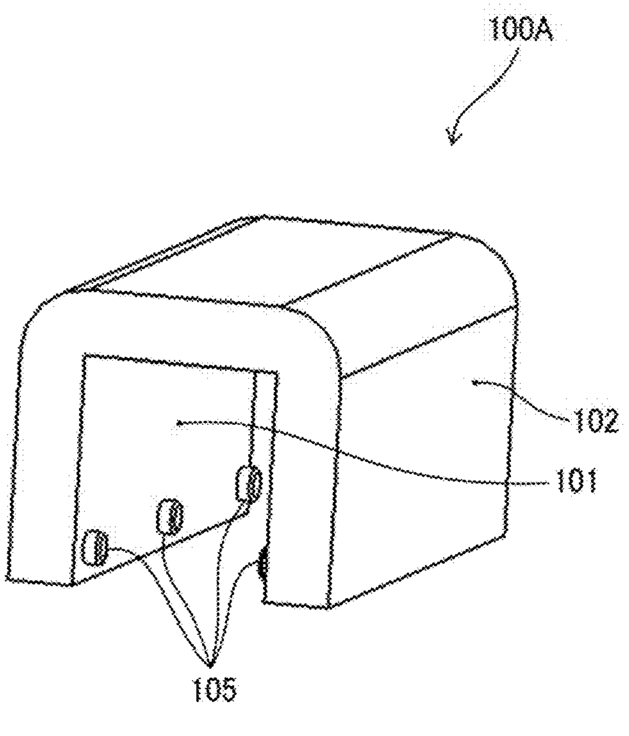
FIG. 12 is a perspective view of the operation assisting tool of a modification.

FIG. 12 is a perspective view of an operation assisting tool 100A of the modification.

The operation assisting tool 100A of the modification is made of a soft resinous material such as polypropylene (PP) or a rubber material such as urethane or silicon. The operation assisting tool 100A is elastically deformed by the gripping force of the user.

The operation assisting tool 100A of the modification includes the stoppers 105 at the lower portion of the first face and the second face of the engagement portion. The stoppers 105 are disposed at given intervals in the width direction. Each of the stoppers 105 have a cylindrical convex shape.

Figure 13A:
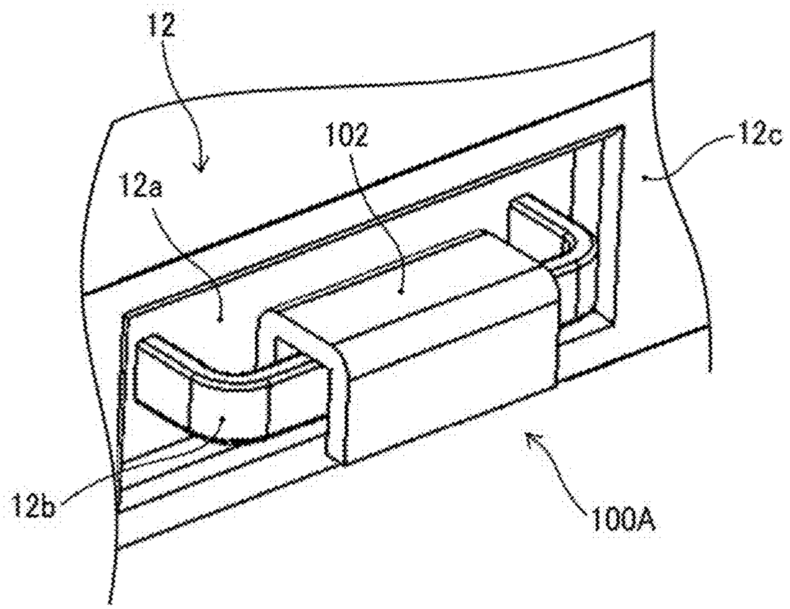
FIGS. 13A and 13B are diagrams, each illustrating the operation assisting tool of the modification attached to the handle.
Figure 13B:
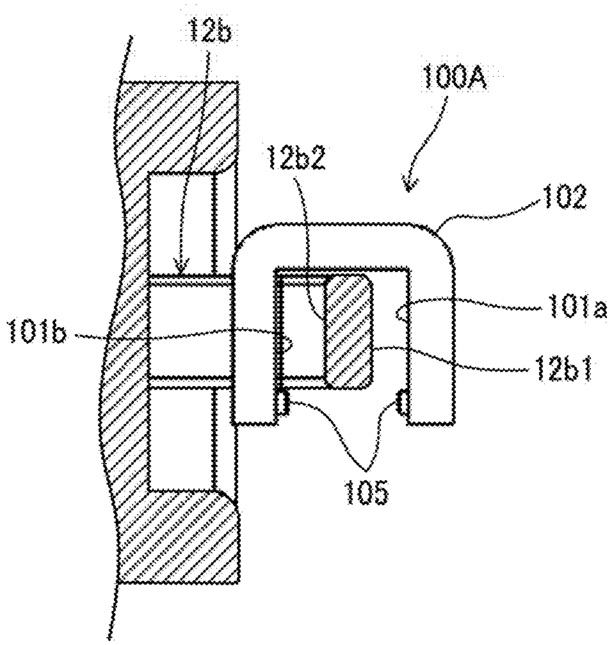

FIGS. 13A and 13B are diagrams each illustrating the operation assisting tool 100A of the modification, with the operation assisting tool 100A) attached to the handle 12*b*. FIG. 13A is a perspective view of the operation assisting tool 100A, and FIG. 13B is a cross-sectional view of the operation assisting tool 100A.

In this modification, as the operation assisting tool 100A is attached to the handle 12*b*, the first face 101*a* of the engagement portion 101 comes to face the outer circumferential face 12*b*1 of the handle 12*b* and the fingertip contact face 102*c* comes to face the inner circumferential face 12*b*2 of the handle 12*b*. By so doing, as in the above-described embodiments, as the user grips the gripper 102 to pull the handle 12*b*, the second face 101*b* of the engagement portion 101 contacts the inner circumferential face 12*b*2 of the handle 12*b*, so that the sheet tray 12*a* is pulled (detached) from the sheet feeding device 12. As the user grips the gripper 102 to push the handle 12*b*, the first face 101*a* of the engagement portion 101 contacts the outer circumferential face 12*b*1 of the handle 12*b*, so that the sheet tray 12*a* is pushed (attached) to the sheet feeding device 12.

Moreover, as in the above-described embodiments, each of the stoppers 105 of the modification faces the lower face of the handle 12*b* when the sheet tray 12*a* is pulled out and pushed in the sheet feeding device 12, so that the operation assisting tool 100 is prevented from detached from the handle 12*b*. Further, as in the above-described embodiments, the gripper 102 is greater in size than the handle 12*b*, so that the gripper 102 is gripped more easily.

As a result, the force is applied more easily and the operation with the operation assisting tool 100 is performed stably.

In the modification, the user pulls or pushes the sheet tray 12*a* without directly touching the handle 12*b* and contact infection of virus via the handle 12*b* is prevented.

Figure 14A:
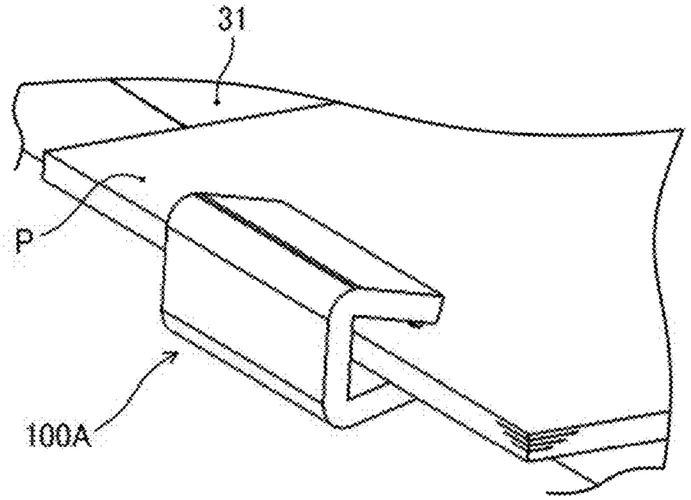
FIGS. 14A and 14B are diagrams, each illustrating the operation assisting tool of the modification gripping a bundle of sheets ejected to a sheet ejection tray.
Figure 14B:
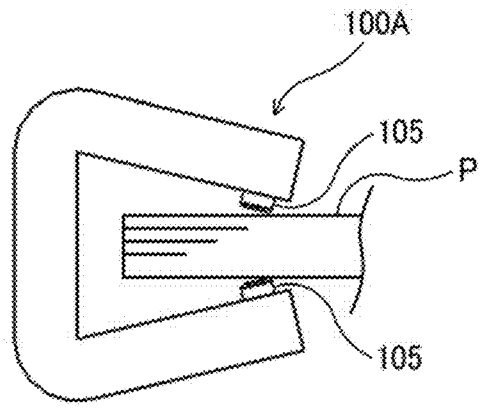

FIGS. 14A and 14B are diagrams each illustrating the operation assisting tool 100A of the modification, the operation assisting tool 100A gripping a sheet bundle ejected to the sheet ejection tray 31. FIG. 14A is a perspective view of the operation assisting tool 100A, and FIG. 14B is a side view of the operation assisting tool 100A.

The operation assisting tool 100A of the modification elastically deforms by the gripping force of the user. Due to such a configuration, as illustrated in FIGS. 14A and 14B, the operation assisting tool 100A is elastically deformed by the gripping force of the user, so that the sheet bundle ejected to the sheet ejection tray 31 is gripped by the operation assisting tool 100A. According to this configuration, the operation assisting tool 100A allows the user to remove the sheet bundle ejected from the sheet ejection tray 31 without directly touching the sheet bundle.

Further, when the sheet bundle is gripped with the operation assisting tool 100A as illustrated in FIG. 14B, the stoppers 105 contact the sheet bundle. In the modification, the stoppers 105 have a plurality of convex shapes. Due to such a configuration, the gripping force of the user is concentrated on the stoppers 105. As a result, the sheet bundle is preferably gripped by the operation assisting tool 100A.

Each of the stoppers 105 may be made of a material having a friction coefficient higher to the sheet than to the body of the operation assisting tool 100A or a material having a high durability and may be made a material different from the material of the body of the operation assisting tool 100A. Each of the stoppers 105 made of a material having a friction coefficient higher to the sheet than to the body of the operation assisting tool 100A prevents the stoppers 105 from sliding and falling from the operation assisting tool 100A due to the weight of the sheet bundle when the operation assisting tool 100A grips the sheet bundle.

The stoppers 105 are attached to the body of the operation assisting tool 100A by a known method such as press-fitting, bonding, or screwing. Preferably, the stoppers 105 are detachably attached to the body of the operation assisting tool 100A by screwing or by press-fitting, so that the stoppers 105 are replaceable. As the stoppers 105 are replaceable, if the stoppers 105 are damaged or broken, the operation assisting tool 100A is continuously used by simply replacing the stoppers 105.

Figure 15:
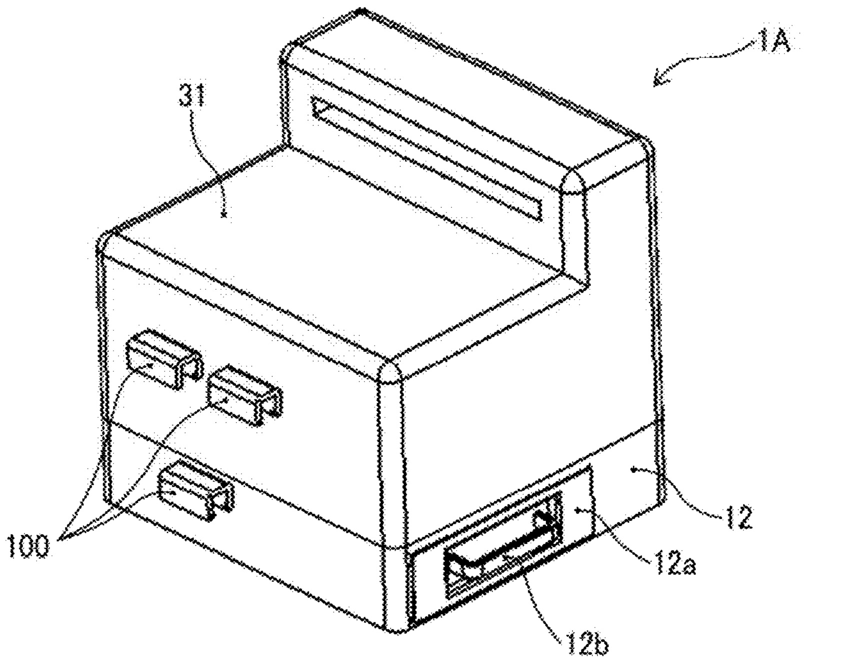
FIG. 15 is a diagram illustrating the operation assisting tool detachably attached to the image forming apparatus.

FIG. 15 is a diagram illustrating the operation assisting tools 100 detachably attached to the image forming apparatus 1A.

As illustrated in FIG. 15, it is desired that the operation assisting tools 100 are detachably attached to the side face of the image forming apparatus 1A on which the operation assisting tools 100 are used. The operation assisting tool 100 is held on the side face of the image forming apparatus 1A by a known method such as press-fitting, adhesion by magnetic force, holding by MAGICTAPE (registered trademark).

Moreover, it is preferable that the colors of the plurality of operation assisting tools held on the side face of the image forming apparatus are made different from each other so that the user of each operation assisting tool is easily identified, in other words, distinguished from another user of another operation assisting tool. Preferably, the operation assisting tool is held not inside the housing of the image forming apparatus but on the outside of the image forming apparatus to expose the operation assisting tool. As a result, for example, sanitization is easily performed by spraying, for example, alcohol when or after the operation assisting tool is used. According to this configuration, the operation assisting tool is easily attached to or detached from the image forming apparatus. Moreover, the operation assisting tool held on the image forming apparatus is easily recognized visually and avoids an inconvenience to search the place on which the operation assisting tool is held.

As described above, by holding the operation assisting tool on the image forming apparatus to which the operation assisting tool is used, the operation assisting tool is prevented from being lost as compared with the case where the user separately stores the operation assisting tool owned by the user. Further, since the user detaches the operation assisting tool held on the image forming apparatus when using the operation assisting tool, it is prevented that the user returns to the storage in which the operation assisting tool owned by the user is separately stored.

In the above description, the operation assisting tool according to the present disclosure is used for the sheet tray 12*a* of the image forming apparatus 1 but not limited to this configuration. For example, the operation assisting tool according to the present disclosure may be used for a device including a drawer.

Figure 16:
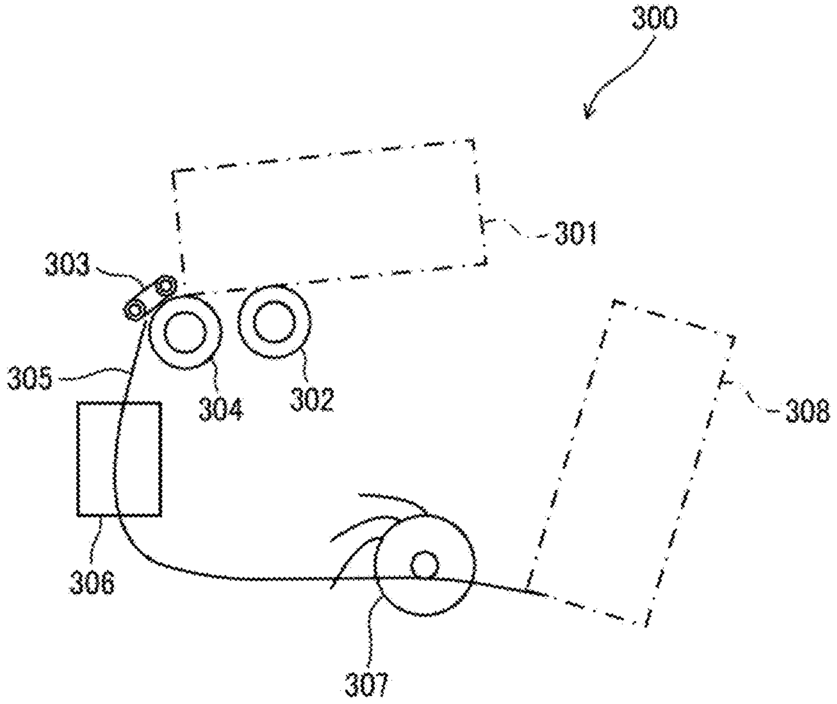
FIG. 16 is a diagram illustrating a schematic configuration of a banknote counter.

FIG. 16 is a schematic diagram illustrating a banknote counter 300 as a device including a drawer.

The banknote counter 300 includes a stacker 301 and an identification unit 306. The stacker 301 functions as a sheet container and a drawer in which banknotes are filled and is drawable from the housing of the banknote counter 300. The identification unit 306 identifies the banknotes. The banknote counter 300 further includes a collection unit 308 that functions as a sheet container and a drawer and a sheet container to collect and accumulate the distinguished banknotes. The collection unit 308 is drawable from the housing of the banknote counter 300.

A feed roller 302 feeds the banknotes stacked in the stacker 301 to a separation nip region formed between a separation belt 303 and a conveyance roller 304 in contact with each other. The separation belt 303 rotates in a direction opposite to the conveyance direction of the banknotes. In a case where multiple banknotes are fed together (multi-feeding), the lowermost banknote alone is conveyed toward the identification unit 306 and the rest of the multiple banknotes are returned by the separation belt 303. By so doing, the plurality of fed banknotes are separated into one banknote. The lowermost banknote separated by the separation nip region is conveyed to the identification unit 306. The identification unit 306 detects the kind of the banknote, so that the amount of money is added in accordance to the kind of the banknote detected by the identification unit 306. A collection wheel 307 is disposed at the distal end of a conveyance passage 305. The banknotes conveyed one by one by the collection wheel 307 are accumulated to the collection unit 308. When a detector that detects banknotes detects that no banknotes are stacked in the stacker 301, conveyance of the banknotes is finished, and the cumulative total of money is displayed on a display of a control panel.

The handle of the stacker 301 and the handle of the collection unit 308 to be gripped when pulling the stacker 301 or the collection unit 308 from the device is likely to be touched by an unspecified number of users. As a result, it is likely that contact infection occurs via the handle of the stacker 301 and the handle of the collection unit 308. For this reason, by using the above-described operation assisting tool when pulling and pushing the stacker 301 and the collection unit 308, the stacker 301 and the collection unit 308 are pulled out without directly touching the handle of the stacker 301 and the handle of the collection unit 308, and contact infection is prevented.

The above-described embodiments are limited examples, and the present disclosure includes, for example, the following aspects (modes) having advantageous effects.

Mode 1

In Mode 1, an operation assisting tool (for example, the operation assisting tool 100) includes a gripper (for example, the gripper 102), and an engagement portion (for example, the engagement portion 101) to engage with a handle (for example, the handle 12*b*) of a drawer (for example, the sheet feeding device 12, the sheet tray 12*a*) drawable from a housing (for example, the housing 1*a*) of an image forming apparatus (for example, the image forming apparatus 1).

According to this configuration, as described in the embodiments above, by using the operation assisting tool, a user draws out (detaches) the drawer from the housing of the image forming apparatus and pushes (attaches) the drawer into the housing of the image forming apparatus, without touching the handle. As a result, spread of infection via the handle is prevented.

Mode 2

In Mode 2, according to Mode 1, the engagement portion (for example, the engagement portion 101) has a first counter face (for example, the first face 101*a*) and a second counter face (for example, the second face 101*b*) to face a pair of faces (for example, the outer circumferential face 12*b*1, the inner circumferential face 12*b*2) of the handle (for example, the handle 12*b*) that are orthogonal to a drawing direction of the drawer (for example, the sheet tray 12*a*). The first counter face of the engagement portion is to face downstream one (for example, the outer circumferential face 12*b*1) of the pair of faces of the handle in the moving direction, and the second counter face of the engagement portion is to face upstream one (for example, the inner circumferential face 12*b*2) of the pair of faces of the handle in the moving direction.

According to this configuration, as described in the embodiments above, when the drawer such as the sheet tray 12*a* is drawn out from the housing (for example, the housing 1*a*), the first counter face such as the first face 101*a* contacts the handle such as the handle 12*b*. By so doing, the pulling force of a user is transmitted to the handle to draw out the drawer from the housing of the image forming apparatus.

To push (attach) the drawer to the housing, the second counter face such as the second face 101*b* contacts the handle. By so doing, the pushing force of the user is transmitted to the handle to push the drawer into the housing of the image forming apparatus. As a result, pulling and pushing the drawer with respect to the housing of the image forming apparatus is performed with the operation assisting tool.

Mode 3

In Mode 3, according to Mode 2, the first counter face (for example, the first face 101*a*) and the second counter face (for example, the second face 101*b*) of the engagement portion (for example, the engagement portion 101) are to face the pair of faces orthogonal to the moving direction, with the operation assisting tool (for example, the operation assisting tool 100) being attached to the handle (for example, the handle 12*b*).

According to this configuration, as described in the embodiments above, the user omits (skips) the operation to set the first counter face such as the first face 101*a* to face the orthogonal face when drawing (pulling) the drawer (for example, the sheet tray 12*a*) and the operation to set the second counter face such as the second face 101*b* to face the orthogonal face when pushing the drawer. As a result, the drawer is pulled out or pushed to the housing (for example, the housing 1*a*) by gripping and pulling or pushing the operation assisting tool attached to the handle such as the handle 12*b*.

Mode 4

In Mode 4, according to Modes 2 or 3, the engagement portion (for example, the engagement portion 101) has an opening to which the handle (for example, the handle 12*b*) is to be inserted. The first counter face (for example, the first face 101*a*) has a first protrusion (for example, the stoppers 105) protruding toward the second counter face (for example, the second face 101*b*). The second counter face has a second protrusion (for example, the stoppers 105) protruding toward the first counter face. Each of the first protrusion and the second protrusion is disposed at a position lower than a position at which the handle is to be inserted to the opening.

According to this configuration, as described in the embodiments above, the operation assisting tool such as the operation assisting tool 100 is prevented from coming off from the handle such as the handle 12*b* while the drawer (for example, the sheet tray 12*a*) is pulled or pushed with the operation assisting tool.

Mode 5

In Mode 5, according to any one of Modes 1 to 4, the operation assisting tool (for example, the operation assisting tool 100) further includes a rotation stopper (for example, the rotation stopper 14) to prevent rotation of the operation assisting tool while the operation assisting tool is attached to the handle (for example, the handle 12*b*) of the drawer (for example, the sheet tray 12*a*).

According to this configuration, as described in the embodiments above, the operation assisting tool attached to the handle such as the handle 12*b* is prevented from rotating about the handle, and the operation assisting tool is maintained at the position for the pulling operation to pull out the drawer. As a result, the operation assisting tool attached to the handle is easily grasped. Moreover, the drawer is drawn (detached) without changing the position of the operation assisting tool, and the drawer is pulled out easily.

Mode 6

In Mode 6, according to any one of Modes 1 to 5, the gripper (for example, the gripper 102) has a palm contact face (for example, the palm contact face 102*a*) on which the palm (for example, the palm h2) of a user contacts when the user grips the gripper and a fingertip contact face (for example, the fingertip contact face 102*c*) on which a fingertip (for example, the fingertip h1) of the user contacts when the user grips the gripper. The length of the palm contact face is longer in a vertical direction than a length of the finger contact face.

According to this configuration, as described in the embodiments above, the gripper such as the gripper 102 is stably gripped, and the drawer (for example, the sheet tray 12*a*) is pulled out from and pushed into the housing (for example, the housing 1*a*) of the image forming apparatus (for example, the image forming apparatus 1) stably with the operation assisting tool.

Mode 7

In Mode 7, according to any one of Modes 1 to 6, the operation assisting tool (for example, the operation assisting tool 100) further includes a panel operation portion (panel operation portion 103) to operate a control panel (control panel 200) provided for the image forming apparatus (for example, the image forming apparatus 1).

According to this configuration, as described in the embodiments above, the operation assisting tool allows the user to operate without directly contacting the control panel (for example, the control panel 200), which prevents contact infection via the control panel.

Mode 8

In Mode 8, according to Mode 7, the panel operation portion (for example, the panel operation portion 103) is attached to the gripper (for example, the gripper 102).

According to this configuration, as described in the embodiments above, the user nips the panel operation portion such as the panel operation portion 103 with the fingers to grip the gripper such as the gripper 102, which allows the user to grip the operation assisting tool (for example, the operation assisting tool 100) reliably. As a result, the operability using the operation assisting tool is enhanced for pulling and pushing the drawer (for example, the sheet tray 12*a*).

Mode 9

In Mode 9, according to Modes 7 or 8, the panel operation portion (for example, the panel operation portion 103) has a replaceable pressing portion (for example, the tip portion 103*a*) to press the control panel (for example, the control panel 200).

According to this configuration, as described in the embodiments above, if the pressing portion such as the tip portion 103*a* is damaged or broken, the operation assisting tool (for example, the operation assisting tool 100) is continuously used by simply replacing the pressing portion.

Mode 10

In Mode 10, according to any one of Modes 7 to 9, the pressing portion (for example, the tip portion 103*a*) that presses at least the control panel (for example, the control panel 200) of the panel operation portion (for example, the panel operation portion 103) is formed by a material different from a body (for example, the gripper 102) of the operation assisting tool (for example, the operation assisting tool 100).

According to this configuration, at least the pressing portion such as the tip portion 103*a* of the panel operation portion such as the panel operation portion 103 is made of a material that achieves easy operation of the control panel. Thus, the pressing portion is made of a material that allows the user to smoothly grip the body of the operation assisting tool. As a result, this configuration of Mode 10 easily achieves both the good operability of the control panel such as the control panel 200 and the good operability of the drawer such as the sheet tray 12*a*.

Mode 11

In Mode 11, according to any one of Modes 1 to 10, the engagement portion (for example, the engagement portion 101) is replaceable.

According to this configuration, as described in the embodiments above, if the engagement portion such as the engagement portion 101 is damaged or broken, the operation assisting tool (for example, the operation assisting tool 100) is continuously used by simply replacing the engagement portion.

Mode 12

In Mode 12, according to any one of Modes 1 to 11, the engagement portion (for example, the engagement portion 101) is formed by a material different from a body (for example, the gripper 102) of the operation assisting tool (for example, the operation assisting tool 100).

According to this configuration, as described in the embodiments above, the engagement portion such as the engagement portion 101 is made of a material that is suitable for engagement with the handle (for example, the handle 12*b*), and the gripper such as the gripper 102 is made of a material that is suitable for gripping by the user.

As a result, the operation of the drawer such as the sheet tray 12*a* is performed favorably.

Mode 13

In Mode 13, according to Mode 12, a coefficient of friction of the engagement portion (for example, the engagement portion 101) on the handle (for example, the handle 12*b*) is greater than a coefficient of friction of the body on the handle.

According to this configuration, as described in the embodiments above, the operation assisting tool (for example, the operation assisting tool 100) is prevented from moving with respect to the handle such as the handle 12*b* when the engagement portion such as the engagement portion 101 contacts the handle to pull and push the drawer (for example, the sheet tray 12*a*). As a result, the pulling operation and the pushing operation of the drawer are performed favorably.

Mode 14

In Mode 14, according to any one of Modes 1 to 13, at least the gripper (for example, the gripper 102) is subjected to antibacterial treatment.

According to this configuration, as described in the embodiments above, contact infection via the operation assisting tool (for example, the operation assisting tool 100) is preferably prevented.

Mode 15

In Mode 15, according to any one of Modes 1 to 13, at least the gripper (for example, the gripper 102) includes metal.

According to this configuration, as described in the embodiments above, contact infection via the operation assisting tool (for example, the operation assisting tool 100) is preferably prevented.

Mode 16

In Mode 16, according to Modes 1 to 15, the engagement portion (for example, the engagement portion 101) corresponds to an inner circumferential face of an arc portion to which the handle (for example, the handle 12*b*) is to be inserted, the gripper (for example, the gripper 102) corresponds to an outer circumferential face of the arc portion, and the arc portion is deformable.

According to this configuration, as described in the modification, the operation assisting tool (for example, the operation assisting tool 100) is flexibly deformed for the user to grip, for example, a sheet bundle ejected from the image forming apparatus (for example, the image forming apparatus 1), and the sheet bundle is removed from the sheet ejection tray (for example, the sheet ejection tray 31) without directly contacting the sheet bundle by the operation assisting tool.

Mode 17

In Mode 17, according to Mode 16, the operation assisting tool (for example, the operation assisting tool 100) further includes a protrusion (for example, the stoppers 105) disposed at a lower end of the inner circumferential face of the arc portion.

According to this configuration, as described in the modification, the protrusion faces the handle (for example, the handle 12*b*), so that the operation assisting tool is prevented from detached from the handle when the drawer (for example, the sheet tray 12*a*) is pulled out or pushed into the image forming apparatus (such as the image forming apparatus 1). Further, when a sheet bundle is gripped, the protrusion contacts the sheet bundle to grip with a relatively high contact pressure.

Mode 18

In Mode 18, according to Mode 17, the protrusion (for example, the stoppers 105) is replaceable.

According to this configuration, as described in the modification, if the protrusion such as the stoppers 105 is damaged or broken, the operation assisting tool (for example, the operation assisting tool 100) is continuously used by simply replacing the protrusion.

Mode 19

In Mode 19, according to Modes 17 or 18, the protrusion (for example, the stoppers 105) is formed by a material different from the arc portion.

According to this configuration, as described in the modification, the protrusion such as the stoppers 105 is made of a material that favorably nip the sheet bundle by the operation assisting tool (for example, the operation assisting tool 100), and the arc portion is formed of a material that is easily gripped by the user. As a result, this configuration of Mode 19 easily achieves both the good performance of gripping a sheet bundle with the operation assisting tool and the good operability of the drawer.

Mode 20

In Mode 20, according to any one of Modes 1 to 19, the operation assisting tool (for example, the operation assisting tool 100) is detachably attached to the housing (for example, the housing 1*a*) of the image forming apparatus (for example, the image forming apparatus 1).

According to this configuration, as described with reference to FIG. 15, the operation assisting tool is prevented from being lost as compared with the case where the user separately stores the operation assisting tool. Further, since the user detaches the operation assisting tool held by the housing of the image forming apparatus when using the operation assisting tool, it is prevented that the user returns to the storage in which each operation assisting tool is separately stored.

Mode 21

In Mode 21, according to any one of Modes 1 to 20, the handle (for example, the handle 12*b*) is a handle of the sheet container (for example, the sheet tray 12*a*) to contain sheets.

According to this configuration, as described in the embodiments above, infection of virus via the handle of the sheet container is prevented.

Mode 22

In Mode 22, an image forming apparatus (for example, the image forming apparatus 1) including a housing (for example, the housing 1*a*), a drawer (for example, the sheet feeding device 12, the sheet tray 12*a*) drawable from the housing, and the operation assisting tool (for example, the operation assisting tool 100) of any one of Modes 1 to 21.

According to this configuration, as described in the embodiments above, infection of virus via the handle of the drawer is prevented.

Mode 23

In Mode 23, according to Mode 22, the operation assisting tool (for example, the operation assisting tool 100) is held on a portion visible from an outside of the image forming apparatus (for example, the image forming apparatus 1).

According to this, as described with reference to FIG. 15, the operation assisting tool held by the image forming apparatus is found easily.

Mode 24

In Mode 24, according to Modes 22 or 23, a plurality of operation assisting tools (for example, the plurality of operation assisting tools 100) including the operation assisting tool (for example, the operation assisting tool 100) is held on the image forming apparatus (for example, the image forming apparatus 1).

According to this configuration, the plurality of operation assisting tools for a plurality of users is held by the image forming apparatus.

Mode 25

In Mode 25, according to Mode 24, the plurality of operation assisting tools (for example, the plurality of operation assisting tools 100) has different colors from each other.

According to this configuration, as described with reference to FIG. 15, the operation assisting tool of a user is distinguished from the operation assisting tool of another user, from the plurality of operation assisting tools held by the image forming apparatus (for example, the image forming apparatus 1).

Mode 26

In Mode 26, according to any one of Modes 22 to 25, the drawer (for example, the sheet tray 12*a*) includes a sheet tray.

According to this configuration, as described in the embodiments above, infection of virus via the handle (for example, the handle 12*b*) of the sheet tray is prevented.

The present disclosure is not limited to specific embodiments described above, and numerous additional modifications and variations are possible in light of the teachings within the technical scope of the appended claims. It is therefore to be understood that, the disclosure of this patent specification may be practiced otherwise by those skilled in the art than as specifically described herein, and such, modifications, alternatives are within the technical scope of the appended claims. Such embodiments and variations thereof are included in the scope and gist of the embodiments of the present disclosure and are included in the embodiments described in claims and the equivalent scope thereof.

The effects described in the embodiments of this disclosure are listed as the examples of preferable effects derived from this disclosure, and therefore are not intended to limit to the embodiments of this disclosure.

The embodiments described above are presented as an example to implement this disclosure. The embodiments described above are not intended to limit the scope of the invention. These novel embodiments can be implemented in various other forms, and various omissions, replacements, or changes can be made without departing from the gist of the invention. These embodiments and their variations are included in the scope and gist of this disclosure and are included in the scope of the invention recited in the claims and its equivalent.

Any one of the above-described operations may be performed in various other ways, for example, in an order different from the one described above.

Each of the functions of the described embodiments may be implemented by one or more processing circuits or circuitry. Processing circuitry includes a programmed processor, as a processor includes circuitry. A processing circuit also includes devices such as an application specific integrated circuit (ASIC), digital signal processor (DSP), field programmable gate array (FPGA), and conventional circuit components arranged to perform the recited functions.

What is claimed is:

1. An operation assisting tool comprising:

a gripper; and an engagement portion to engage with a handle of a drawer drawable from a housing of an apparatus, wherein the engagement portion has a first counter face and a second counter face to face a pair of faces of the handle that are orthogonal to a moving direction of the drawer, wherein the first counter face of the engagement portion is to face downstream one of the pair of faces of the handle in the moving direction, and wherein the second counter face of the engagement portion is to face upstream one of the pair of faces of the handle in the moving direction, wherein the engagement portion has an opening to which the handle is to be inserted, wherein the first counter face has a first protrusion protruding toward the second counter face, wherein the second counter face has a second protrusion protruding toward the first counter face, and wherein each of the first protrusion and the second protrusion is disposed at a position lower than a position at which the handle is to be inserted to the opening.

2. The operation assisting tool according to claim 1, wherein the first counter face and the second counter face of the engagement portion are to face the pair of faces orthogonal to the moving direction, with the operation assisting tool being attached to the handle.

3. The operation assisting tool according to claim 1, further comprising:

a rotation stopper to prevent rotation of the operation assisting tool while the operation assisting tool is attached to the handle of the drawer.

4. The operation assisting tool according to claim 1, wherein the gripper has a palm contact face on which a palm of a user contacts when the user grips the gripper and a fingertip contact face on which a fingertip of the user contacts when the user grips the gripper, and a length of the palm contact face is longer in a vertical direction than a length of the fingertip contact face.

5. The operation assisting tool according to claim 1, further comprising:

a panel operation portion to operate a control panel provided for the apparatus.

6. The operation assisting tool according to claim 5, wherein the panel operation portion is attached to the gripper.

7. The operation assisting tool according to claim 5, wherein the panel operation portion has a replaceable pressing portion to press the control panel.

8. The operation assisting tool according to claim 1, wherein the engagement portion is made of a material different from a material of a body of the operation assisting tool.

9. The operation assisting tool according to claim 8, wherein a coefficient of friction of the engagement portion on the handle is greater than a coefficient of friction of the body on the handle.

10. The operation assisting tool according to claim 1, wherein at least the gripper is subjected to antibacterial treatment.

11. The operation assisting tool according to claim 1, wherein the engagement portion corresponds to an inner circumferential face of an arc portion to which the handle is to be inserted, wherein the gripper corresponds to an outer circumferential face of the arc portion, and wherein the arc portion is deformable.

12. The operation assisting tool according to claim 11, further comprising a protrusion disposed at a lower end of the inner circumferential face of the arc portion.

13. The operation assisting tool according to claim 1, wherein the operation assisting tool is detachably attached to the housing of the apparatus.

14. An image forming apparatus comprising:
a housing;
a drawer drawable from the housing; and
the operation assisting tool according to claim 1.

15. The image forming apparatus according to claim 14, wherein the operation assisting tool is held on a portion visible from an outside of the image forming apparatus.

16. The image forming apparatus according to claim 14, wherein a plurality of operation assisting tools including the operation assisting tool is held on the image forming apparatus.

17. The image forming apparatus according to claim 16, wherein the plurality of operation assisting tools has different colors from each other.

18. The image forming apparatus according to claim 14, wherein the drawer includes a sheet tray.

* * * * *